(12) United States Patent
Watanabe

(10) Patent No.: US 9,219,539 B2
(45) Date of Patent: Dec. 22, 2015

(54) COMMUNICATION SYSTEM, TRANSMISSION APPARATUS, RECEPTION APPARATUS, AND COMMUNICATION METHOD

(71) Applicant: Kiwamu Watanabe, Kanagawa (JP)

(72) Inventor: Kiwamu Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 50 days.

(21) Appl. No.: 14/203,752

(22) Filed: Mar. 11, 2014

(65) Prior Publication Data

US 2014/0274178 A1 Sep. 18, 2014

(30) Foreign Application Priority Data

Mar. 13, 2013 (JP) ................................ 2013-050891

(51) Int. Cl.
| | |
|---|---|
| H04B 7/185 | (2006.01) |
| H04B 7/24 | (2006.01) |
| H04N 21/2385 | (2011.01) |
| H04N 21/443 | (2011.01) |
| H04N 21/647 | (2011.01) |

(52) U.S. Cl.
CPC ............. *H04B 7/24* (2013.01); *H04N 21/2385* (2013.01); *H04N 21/4436* (2013.01); *H04N 21/64707* (2013.01)

(58) Field of Classification Search
CPC . H04W 84/18; H04W 4/005; H04W 52/0216; H04W 4/008; H04W 72/12; H04W 74/04
USPC ...................... 455/41.2, 11.1, 13.1, 3.06, 503
See application file for complete search history.

(56) References Cited

U.S. PATENT DOCUMENTS

| | | | |
|---|---|---|---|
| 7,378,984 B2 | 5/2008 | Suzuki et al. | |
| 7,961,694 B1 * | 6/2011 | Chan et al. | ..................... 370/341 |
| 8,266,658 B2 | 9/2012 | Funabiki et al. | |
| 2014/0185499 A1 * | 7/2014 | Ray et al. | ....................... 370/310 |

FOREIGN PATENT DOCUMENTS

| | | |
|---|---|---|
| JP | 2004-208290 | 7/2004 |
| JP | 2008-252929 | 10/2008 |

* cited by examiner

*Primary Examiner* — Tu X Nguyen
(74) *Attorney, Agent, or Firm* — IPUSA, PLLC

(57) ABSTRACT

A communication system includes transmission apparatuses and a reception apparatus. Each transmission apparatus includes a data input processing unit to which data is input, a first controller that performs a control process for transmitting the data, and a first wireless communication processing unit that transmits the data to the reception apparatus according to the control process performed by the first controller. The first controller performs a control process for causing another transmission apparatus to transmit data input to the other transmission apparatus to the reception apparatus. The reception apparatus includes a second wireless communication processing unit that receives data from one of the transmission apparatuses, a second controller that performs a control process for outputting the received data, and a data output processing unit that outputs the received data according to the control process performed by the second controller.

8 Claims, 17 Drawing Sheets

FIG.6

| | SENDER | DESTINATION | TRANSMISSION START REQUEST | TRANSMISSION STOP REQUEST | TRANSMISSION END REPORT | RESPONSE |
|---|---|---|---|---|---|---|
| S506 | MAC ADDRESS 1 | MAC ADDRESS 3 | 1 | 0 | 0 | 0 |
| S508 | MAC ADDRESS 3 | MAC ADDRESS 1 | 1 | 0 | 0 | 1 |
| S510 | MAC ADDRESS 3 | MAC ADDRESS 2 | 0 | 1 | 0 | 0 |
| S512 | MAC ADDRESS 2 | MAC ADDRESS 3 | 0 | 1 | 0 | 1 |

FIG.7

| | SENDER | DESTINATION | TRANSMISSION START REQUEST | TRANSMISSION STOP REQUEST | TRANSMISSION END REPORT | RESPONSE |
|---|---|---|---|---|---|---|
| S522 | MAC ADDRESS 1 | MAC ADDRESS 3 | 0 | 0 | 1 | 0 |
| S524 | MAC ADDRESS 3 | MAC ADDRESS 1 | 0 | 0 | 1 | 1 |
| S526 | MAC ADDRESS 3 | MAC ADDRESS 2 | 1 | 0 | 0 | 0 |
| S528 | MAC ADDRESS 2 | MAC ADDRESS 3 | 1 | 0 | 0 | 1 |

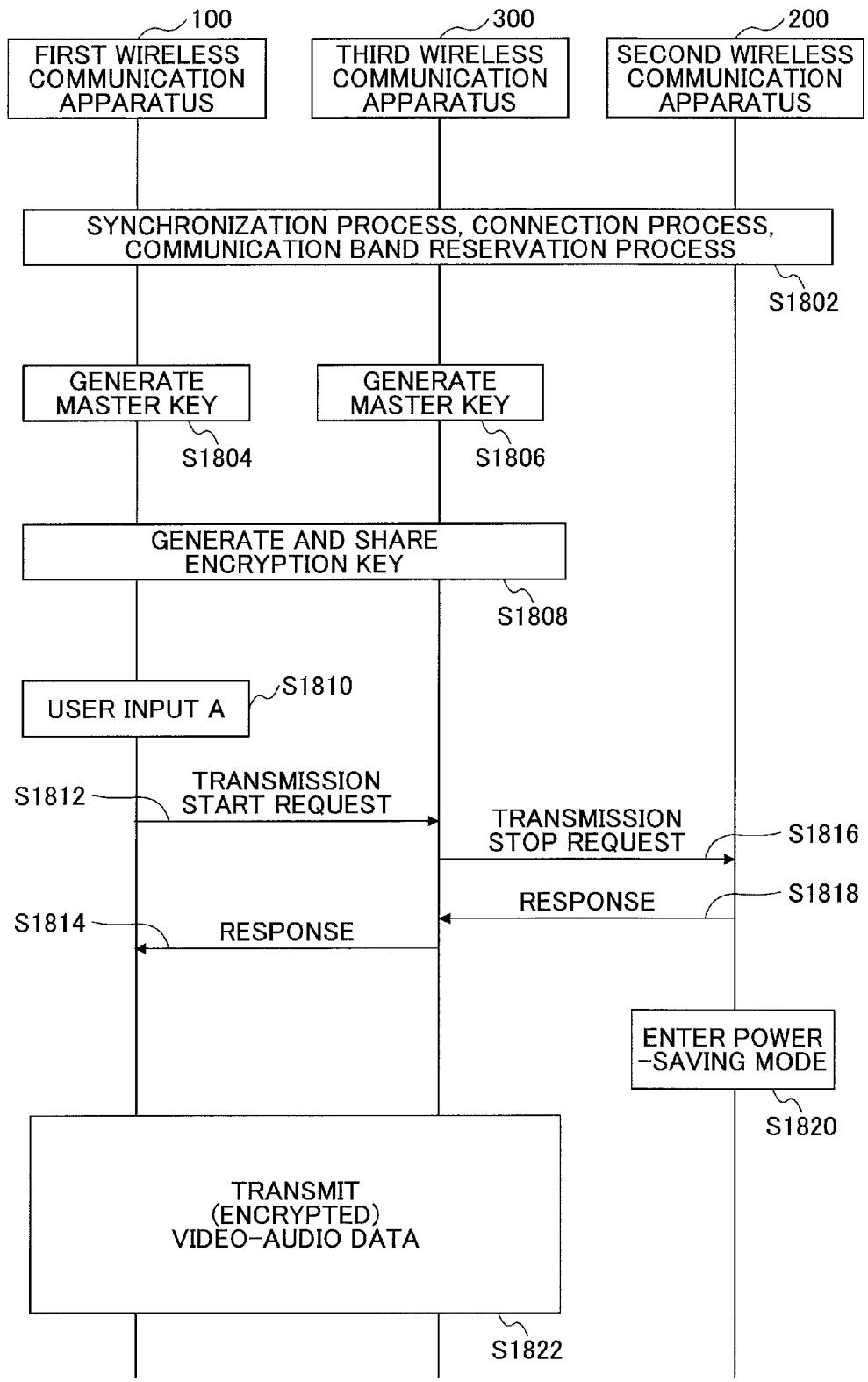

COMMUNICATION SYSTEM, TRANSMISSION APPARATUS, RECEPTION APPARATUS, AND COMMUNICATION METHOD

CROSS-REFERENCE TO RELATED APPLICATION

The present application is based upon and claims the benefit of priority of Japanese Patent Application No. 2013-050891, filed on Mar. 13, 2013, the entire contents of which are incorporated herein by reference.

BACKGROUND OF THE INVENTION

1. Field of the Invention

An aspect of this disclosure relates to a communication system.

2. Description of the Related Art

In recent years, development of wireless network projector systems has been conducted. In a wireless network projector system, a video interface signal output from an audio-visual apparatus such as a personal computer (PC) is wirelessly transmitted to a display apparatus such as a projector or a monitor via a wireless network (e.g., a wireless LAN or millimeter-wave communication) without using a cable.

Japanese Laid-Open Patent Publication No. 2008-252929, for example, discloses a technology for wireless transmission of video (or image) data and audio data between wireless communication apparatuses. The disclosed technology makes it possible to play (or reproduce) video data and audio data with a simple operation using wireless communications.

Japanese Laid-Open Patent Publication No. 2004-208290 discloses a technology for an audio-visual system including a display apparatus, multiple audio-visual apparatuses connected to the display apparatus, and a remote controller for controlling the audio-visual apparatuses. The disclosed technology makes it possible to select and change an audio-visual apparatus that supplies video-audio data to the display apparatus by using the remote controller.

Here, assume a case where an audio-visual apparatus or a module attached to the audio-visual apparatus is selected from multiple audio-visual apparatuses, video data and audio data are transmitted from the selected audio-visual apparatus or module to a display apparatus or a module attached to the display apparatus, and the video data and the audio data are displayed and played by the display apparatus or the module attached to the display apparatus.

In this case, a user cannot select and cause an audio-visual apparatus or a module installed in a remote location to transmit video data and audio data by operating another audio-visual apparatus or a module installed in a location where the user is present.

Also, when attaching a module to a video output interface, it is desired to reduce the size of the module as much as possible. For this reason, it is difficult to attach multiple user input devices or a complex user input device to a video output interface.

SUMMARY OF THE INVENTION

In an aspect of this disclosure, there is provided a communication system including a plurality of transmission apparatuses and a reception apparatus. Each of the transmission apparatuses includes a data input processing unit to which data is input, a first controller that performs a control process for transmitting the data input to the data input processing unit, and a first wireless communication processing unit that transmits the data to the reception apparatus according to the control process performed by the first controller. The first controller performs a control process for causing another transmission apparatus of the transmission apparatuses to transmit data input to the other transmission apparatus to the reception apparatus. The reception apparatus includes a second wireless communication processing unit that receives data from one of the transmission apparatuses, a second controller that performs a control process for outputting the data received by the second wireless communication processing unit, and a data output processing unit that outputs the data received by the second wireless communication processing unit according to the control process performed by the second controller.

BRIEF DESCRIPTION OF THE DRAWINGS

FIG. 6 is a table illustrating exemplary transmission messages;

FIG. 7 is another table illustrating exemplary transmission messages;

FIG. 18 is a sequence chart illustrating a variation of a process performed by a wireless network projector system.

DESCRIPTION OF THE PREFERRED EMBODIMENTS

Preferred embodiments of the present invention are described below with reference to the accompanying drawings.

Throughout the accompanying drawings, the same reference number is assigned to components having the same function, and repeated descriptions of the components are omitted.

<<First Embodiment>>
<Communication System>

Figure 1:
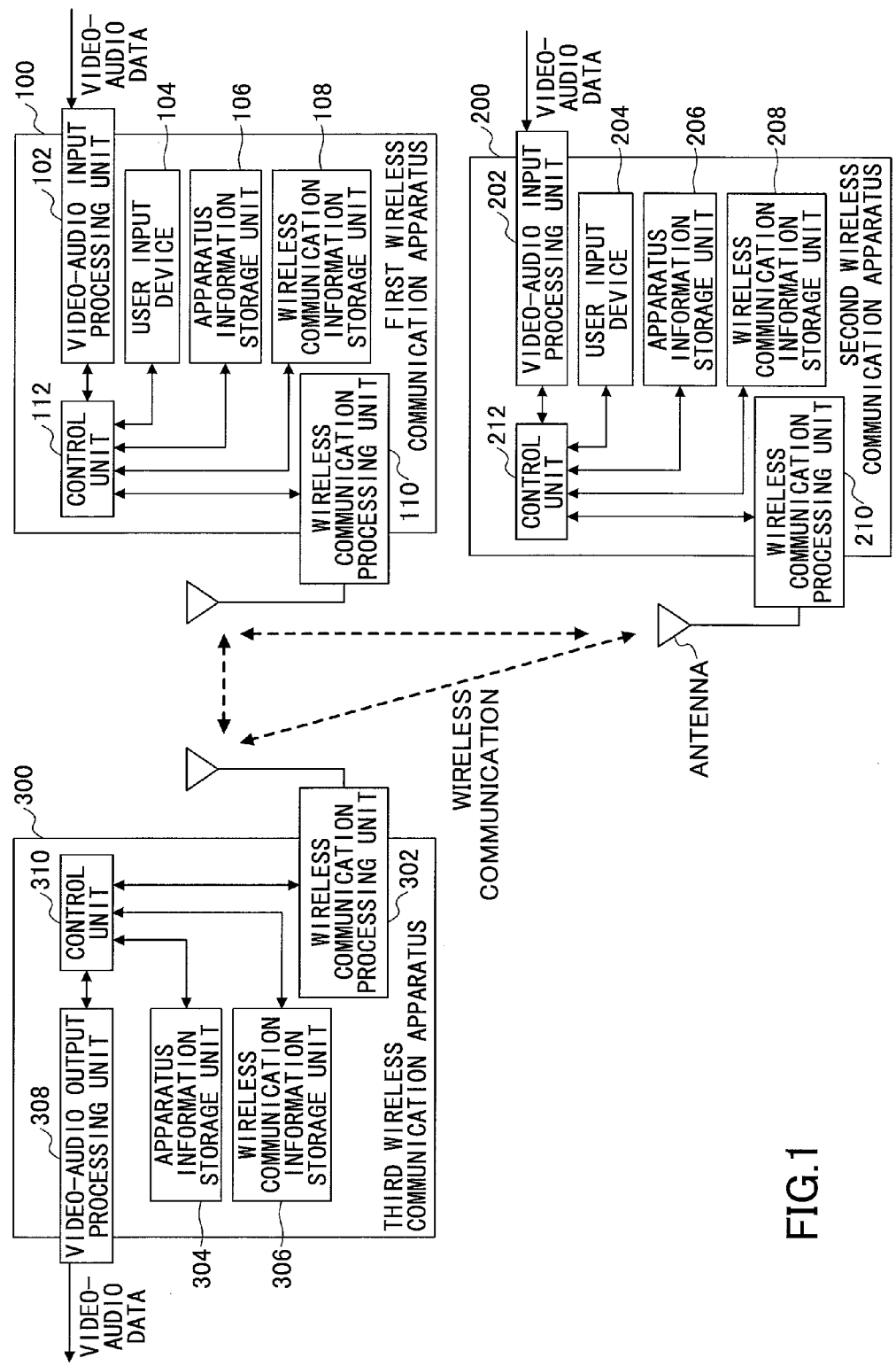
FIG. 1 is a drawing illustrating an exemplary configuration of a communication system.

FIG. 1 is a drawing illustrating an exemplary configuration of a communication system. FIG. 1 illustrates a wireless network projector system as an example of a communication system.

The wireless network projector system may include a first wireless communication apparatus 100, a second wireless communication apparatus 200, and a third wireless communication apparatus 300.

Each of the first wireless communication apparatus 100 and the second wireless communication apparatus 200 is connected to a video-audio output terminal that outputs video (or image) data and audio data. Below, the first wireless communication apparatus 100 may be referred to as a "first source apparatus" and the second wireless communication apparatus 200 may be referred to as a "second source apparatus". The video-audio output terminal is included in, for example, a terminal device such as a personal computer (PC) or a portable terminal device such as a media player. The wireless network projector system may additionally include wireless communication apparatuses having configurations similar to those of the first wireless communication apparatus 100 and the second wireless communication apparatus 200.

The third wireless communication apparatus 300 receives video data and audio data from the first wireless communication apparatus 100 and the second wireless communication apparatus 200, and inputs the received video data and audio data to a video-audio input terminal of a display apparatus such as a television or a projector. Hereafter, video data and audio data are collectively referred to as "video-audio data". Also, the third wireless communication apparatus 300 may be referred to as a "synchronization apparatus".

<First Wireless Communication Apparatus>

The first wireless communication apparatus 100 may include a video-audio input processing unit 102, a user input device 104, an apparatus information storage unit 106, a wireless communication information storage unit 108, a wireless communication processing unit 110, and a control unit 112. The second wireless communication apparatus 200 has substantially the same configuration as that of the first wireless communication apparatus 100. Therefore, descriptions of the configuration of the second wireless communication apparatus 200 are omitted.

The video-audio input processing unit 102 receives video-audio data from the video-audio output terminal connected to the first wireless communication apparatus 100. The video-audio output terminal preferably conforms to a standard such as Digital Visual Interface (DVI) or High-Definition Multimedia Interface (HDMI). The video-audio input processing unit 102 inputs the received video-audio data to the control unit 112. The control unit 112 inputs the video-audio data to the wireless communication processing unit 110.

The user input device 104 receives user inputs. The user input device 104 inputs information entered by the user to the control unit 112. The user input device 104 preferably includes a button switch.

The apparatus information storage unit 106 stores sets of identification information (IDs) that are unique to wireless communication apparatuses. The IDs are preferably MAC addresses of the first source apparatus, the second source apparatus, and the synchronization apparatus. However, the IDs may also be represented by identifiers other than MAC addresses.

The wireless communication information storage unit 108 stores information indicating frequency bands used for wireless communications, reservation information for a frequency band used to transmit video-audio data, and stream IDs.

The control unit 112 is connected to the video-audio input processing unit 102, the user input device 104, the apparatus information storage unit 106, the wireless communication information storage unit 108, and the wireless communication processing unit 110. The control unit 112 controls the video-audio input processing unit 102, the user input device 104, the apparatus information storage unit 106, the wireless communication information storage unit 108, and the wireless communication processing unit 110. The control unit 112 is preferably implemented by a central processing unit (CPU) and a memory.

The control unit 112 determines the type of information input via the user input device 104. The control unit 112 may be configured to determine the type of input information by detecting, for example, an event where the button switch of the user input device 104 is pressed successively at high speed or an even where the button switch is pressed for a long period of time.

The control unit 112 determines whether input information from the user input device 104 is a user input A. When the input information is the user input A, the control unit 112 performs a control process to transmit, to the third wireless communication apparatus 300, a transmission start request indicating that transmission of video-audio data is to be started. When the input information is the user input A and after the transmission start request is transmitted from the first wireless communication apparatus 100 to the third wireless communication apparatus 300, control information is exchanged between the second wireless communication apparatus 200 and the third wireless communication apparatus 300, and transmission of video-audio data from the second wireless communication apparatus 200 is stopped. More specifically, the third wireless communication apparatus 300 transmits, to the second wireless communication apparatus 200, a transmission stop request that requests the second wireless communication apparatus 200 to stop transmission of video-audio data. In response to the transmission stop request from the third wireless communication apparatus 300, a control unit 212 of the second wireless communication apparatus 200 performs a control process to stop transmission of video-audio data. The control unit 112 of the first wireless communication apparatus 100 performs a control process to transmit the video-audio data, which is input from the video-audio input processing unit 102, from the wireless communication processing unit 110 to the third wireless communication apparatus 300.

The control unit 112 determines whether input information from the user input device 104 is a user input B. When the input information is the user input B, the control unit 112 of the first wireless communication apparatus 100 stops the control process for transmitting the video-audio data, which is input from the video-audio input processing unit 102, from the wireless communication processing unit 110 to the third wireless communication apparatus 300. After stopping the control process for transmitting the video-audio data, the control unit 112 performs a control process to transmit, to the third wireless communication apparatus 300, a transmission end report indicating that the transmission of the video-audio data has been stopped. When the input information is the user input B and after the transmission end report is transmitted from the first wireless communication apparatus 100 to the third wireless communication apparatus 300, control information is exchanged between the third wireless communication apparatus 300 and the second wireless communication apparatus 200, and transmission of video-audio data from the second wireless communication apparatus 200 to the third wireless communication apparatus is started. More specifically, the third wireless communication apparatus 300 transmits, to the second wireless communication apparatus 200, a transmission start request that requests the second wireless communication apparatus 200 to start transmission of video-audio data. In response to the transmission start request from the third wireless communication apparatus 300, the control unit 212 of the second wireless communication apparatus 200 performs a control process to start transmission of video-audio data.

The control unit 112 also includes functions of the control unit 212 described above.

The wireless communication processing unit 110 is connected to the control unit 112. The wireless communication processing unit 110 wirelessly transmits video-audio data. The wireless communication processing unit 110 is preferably configured to wirelessly transmit video-audio data according to a standard such as WiMedia (IEEE [The Institute of Electrical and Electronics Engineers, Inc.] 802.15.3a, ECMA-368), IEEE 802.11 Wireless LAN, or millimeter-wave Wireless Personal Area Network (PAN) (e.g., IEEE 802.15.3c).

Figure 2:
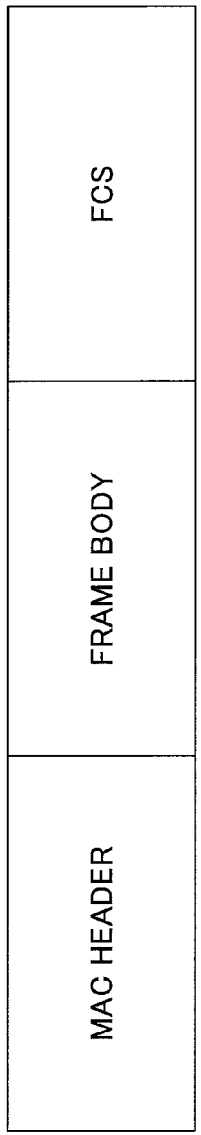
FIG. 2 is a drawing illustrating an exemplary structure of a transmission frame.

FIG. 2 is a drawing illustrating an exemplary structure of a frame transmitted by the wireless communication processing unit 110. More specifically, FIG. 2 illustrates a basic MAC (media access control) frame format of IEEE 802.11 Wireless LAN.

The basic MAC frame format of IEEE 802.11 Wireless LAN includes a MAC header, a frame body, and a frame check sequence (FCS).

The MAC header includes, for example, frame control information and a sender MAC address.

The frame body includes data to be transmitted.

The FCS includes an error correcting code for the MAC header and the frame body.

In the wireless network projector system of the present embodiment, a MAC address of a wireless communication apparatus wirelessly transmitting video-audio data is included in the MAC header, and video-audio data is included in the frame body.

Even when WiMedia or millimeter-wave Wireless PAN (IEEE802.15.3c) is used instead of IEEE 802.11 Wireless LAN as a wireless communication standard, the basic format of a frame does not differ greatly from the basic MAC frame format described above.

<Third Wireless Communication Apparatus>

The third wireless communication apparatus 300 may include a wireless communication processing unit 302, an apparatus information storage unit 304, a wireless communication information storage unit 306, a video-audio output processing unit 308, and a control unit 310.

The wireless communication processing unit 302 receives synchronization data, control data, and video-audio data from the first wireless communication apparatus 100 and the second wireless communication apparatus 200. The wireless communication processing unit 302 is preferably configured to receive data according to a standard such as WiMedia, IEEE 802.11 Wireless LAN, or millimeter-wave Wireless PAN. The wireless communication processing unit 302 inputs the received synchronization data, control data, and video-audio data to the control unit 310.

The apparatus information storage unit 304 stores sets of identification information (IDs) that are unique to wireless communication apparatuses. The IDs are preferably MAC addresses of the first source apparatus, the second source apparatus, and the synchronization apparatus. However, the IDs may also be represented by identifiers other than MAC addresses.

The wireless communication information storage unit 306 stores information indicating frequency bands used for wireless communications, reservation information for a frequency band used to transmit video-audio data, and stream IDs.

The video-audio output processing unit 308 outputs video-audio data to the video-audio input terminal connected to the third wireless communication apparatus 300. The video-audio input terminal preferably conforms to a standard such as DVI or HDMI. The video-audio output processing unit 308 outputs video-audio data, which is input from the control unit 310, to the video-audio input terminal.

The control unit 310 is connected to the wireless communication processing unit 302, the apparatus information storage unit 304, the wireless communication information storage unit 306, and the video-audio output processing unit 308. The control unit 310 controls the wireless communication processing unit 302, the apparatus information storage unit 304, the wireless communication information storage unit 306, and the video-audio output processing unit 308. The control unit 310 is preferably implemented by a CPU and a memory.

The control unit 310 performs a synchronization process based on synchronization signals received from the first wireless communication apparatus 100 and the second wireless communication apparatus 200.

The control unit 310 controls communications with the first wireless communication apparatus 100 and the second wireless communication apparatus 200 based on the control data received from the first wireless communication apparatus 100 and the second wireless communication apparatus 200. For example, when a transmission start request is received from the first wireless communication apparatus 100, the control unit 310 performs a control process to transmit a transmission stop request that requests the second wireless communication apparatus 200 to stop transmission of video-audio data. The control unit 310 performs a control process to transmit a response to the transmission start request to the first wireless communication apparatus 100.

When a transmission end report is received from the first wireless communication apparatus 100, the control unit 310 performs a control process to transmit a transmission start request that requests the second wireless communication apparatus 200 to start transmission of video-audio data. When a response to the transmission start request is received from the second wireless communication apparatus 200, the control unit 310 performs a control process to transmit a response to the transmission end report to the first wireless communication apparatus 100.

The control unit 310 inputs video-audio data received from the wireless communication processing unit 302 to the video-audio output processing unit 308.

The video-audio output processing unit 308 outputs the video-audio data received from the control unit 310 to the video-audio input terminal of a display apparatus (not shown) connected to the third wireless communication apparatus 300. The video-audio input terminal preferably conforms to a standard such as DVI or HDMI.

Video-audio data is input to the video-audio input processing unit 102 of the first wireless communication apparatus 100. The video-audio data is wirelessly transmitted via the wireless communication processing unit 110 and an antenna. The video-audio data is received by the wireless communication processing unit 302 of the third wireless communication apparatus 300.

Then, the video-audio data is output from the video-audio output processing unit 308 of the third wireless communication apparatus 300 to a video-audio input terminal of a display apparatus such as a monitor or an external projector.

<First Transmission-Reception Method for Wireless Network Projector System>

Figure 3:
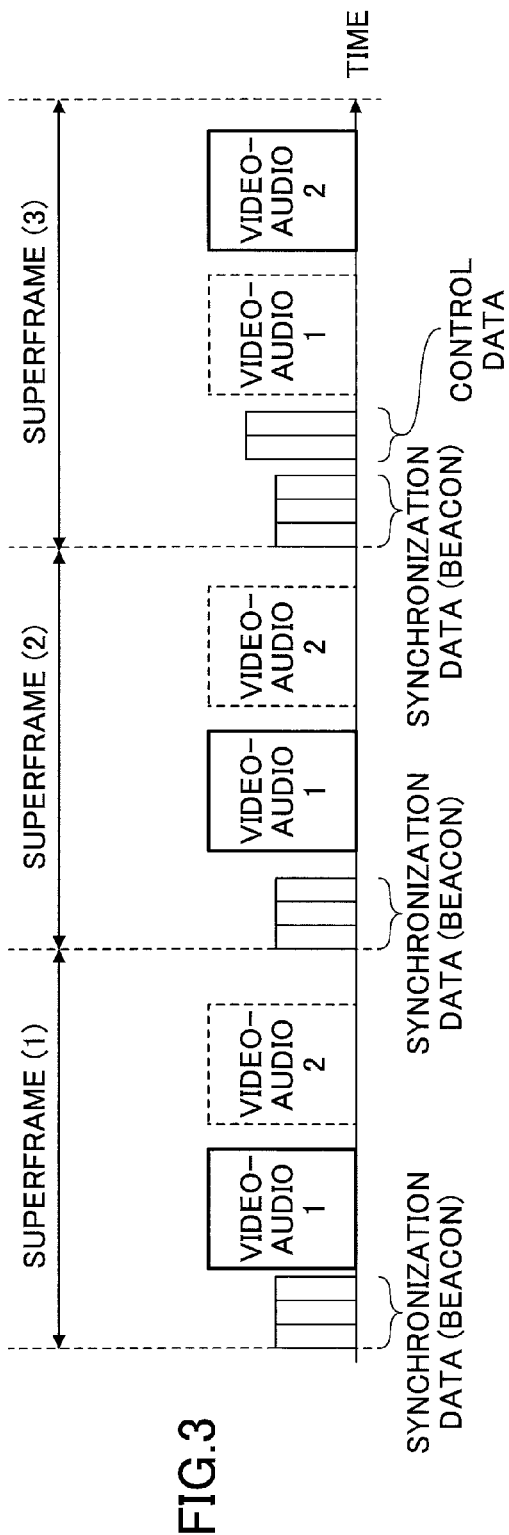
FIG. 3 is a drawing used to describe a first transmission-reception method for a wireless network projector system.

FIG. 3 is a drawing used to describe a first transmission-reception method for the wireless network projector system.

The first wireless communication apparatus 100, the second wireless communication apparatus 200, and the third wireless communication apparatus 300 are preferably configured to perform communications using the same frequency band according to time division multiple access (TDMA). The time division multiple access is used in WiMedia and millimeter-wave communication.

In FIG. 3, the horizontal axis indicates time. In a time division multiple access method of the present embodiment, the first wireless communication apparatus 100, the second wireless communication apparatus 200, and the third wireless communication apparatus 300 participating in the network transmit synchronization data (beacons) at a constant time interval. The constant time interval (or constant time period) may be referred to as a "superframe". The synchronization data is transmitted by the first wireless communication apparatus 100, the second wireless communication apparatus 200, and the third wireless communication apparatus 300 to, for example, participate in the network and perform a band reservation negotiation process for data communications.

During the constant time interval, control data and application data are also transmitted and received in addition to the synchronization data. The application data is, for example, video-audio data. In a band reservation negotiation process for data communications, the first wireless communication apparatus 100, the second wireless communication apparatus 200, and the third wireless communication apparatus 300 negotiate with each other to determine, for example, which wireless communication apparatus transmits video-audio data in which time segment of the superframe.

In the first transmission-reception method for the wireless network projector system of the present embodiment, a time segment, where the first source apparatus or the second source apparatus can transmit video-audio data, is assigned alternately to the first source apparatus and the second source apparatus in each constant time interval represented by the superframe. In FIG. 3, one time segment is assigned to each of the first source apparatus and the second source apparatus in each superframe.

In the example of FIG. 3, the first source apparatus transmits video-audio data (video-audio 1) to the synchronization apparatus in the first two consecutive superframes (1) and (2). In FIG. 3, data is transmitted in a time segment indicated by a solid line, and data is not transmitted in a time segment indicated by a dotted line. In a superframe (3), the second source apparatus transmits video-audio data (video-audio 2) to the synchronization apparatus. Also, during a time period from when the first source apparatus stops transmitting video-audio data to when the second source apparatus starts transmitting video-audio data, control data is transmitted and received among the first wireless communication apparatus 100, the second wireless communication apparatus 200, and the third wireless communication apparatus 300.

<Second Transmission-Reception Method for Wireless Network Projector System>

Figure 4:
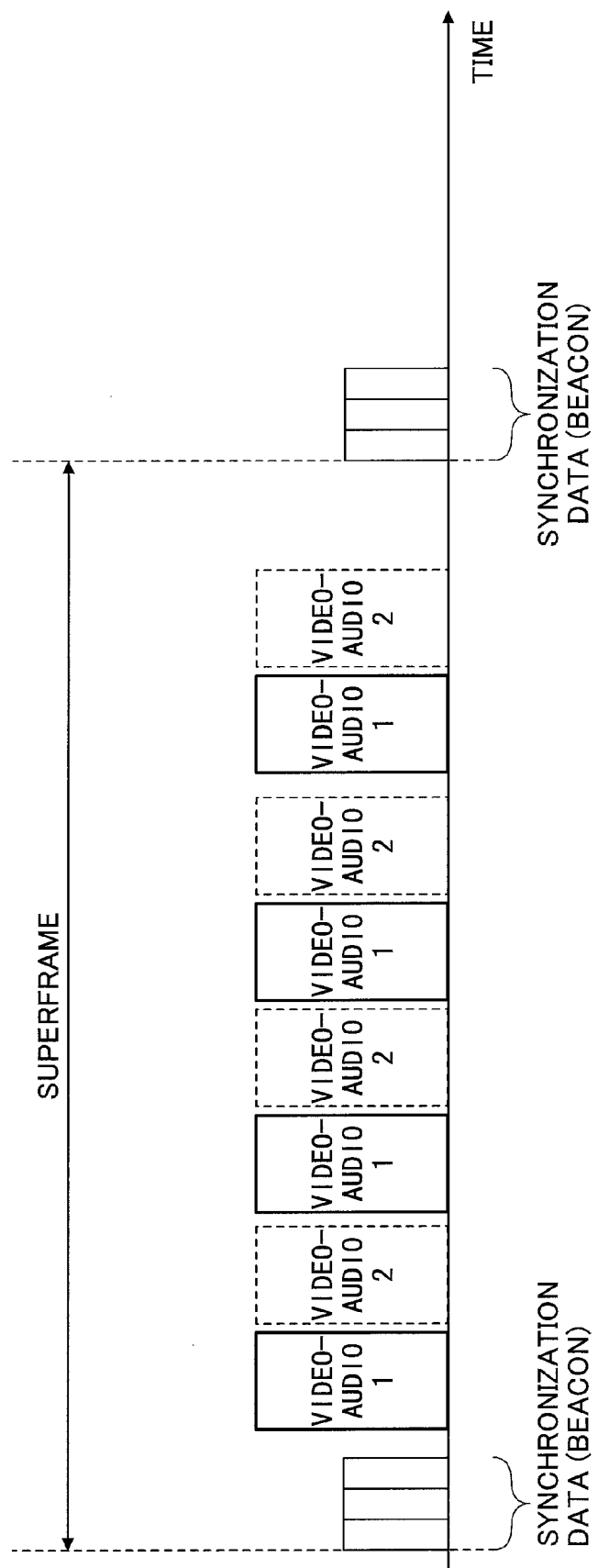
FIG. 4 is a drawing used to describe a second transmission-reception method for a wireless network projector system.

FIG. 4 is a drawing used to describe a second transmission-reception method for the wireless network projector system.

The first wireless communication apparatus 100, the second wireless communication apparatus 200, and the third wireless communication apparatus 300 are preferably configured to perform communications using the same frequency band according to time division multiple access (TDMA). The time division multiple access is used in WiMedia and millimeter-wave communication.

In FIG. 4, the horizontal axis indicates time. In a time division multiple access method of the present embodiment, the first wireless communication apparatus 100, the second wireless communication apparatus 200, and the third wireless communication apparatus 300 participating in the network transmit synchronization data (beacons) at a constant time interval. The constant time interval (or constant time period) may be referred to as a "superframe". The synchronization data is transmitted by the first wireless communication apparatus 100, the second wireless communication apparatus 200, and the third wireless communication apparatus 300 to, for example, participate in the network and perform a band reservation negotiation process for data communications.

During the constant time interval, control data and application data are also transmitted and received in addition to the synchronization data. The application data is, for example, video-audio data. In a band reservation negotiation process for data communications, the first wireless communication apparatus 100, the second wireless communication apparatus 200, and the third wireless communication apparatus 300 negotiate with each other to determine, for example, which wireless communication apparatus transmits video-audio data in which time segment of the superframe.

In the second transmission-reception method for the wireless network projector system of the present embodiment, a time segment, where the first source apparatus or the second source apparatus can transmit video-audio data, is assigned alternately to the first source apparatus and the second source apparatus in each constant time interval represented by the superframe. In FIG. 4, multiple time segments are assigned to each of the first source apparatus and the second source apparatus in each superframe.

In the example of FIG. 4, the first source apparatus transmits video-audio data (video-audio 1) to the synchronization apparatus in four time segments in the superframe. The four time segments are arranged apart from each other. In FIG. 4, data is transmitted in a time segment indicated by a solid line, and data is not transmitted in a time segment indicated by a dotted line. Thus, in FIG. 4, time segments where the first source apparatus can transmit data to the synchronization apparatus and time segments where the second source apparatus can transmit data to the synchronization apparatus are arranged alternately at short time intervals. When the video-audio data is input from the synchronization apparatus to the video-audio input terminal, this method or arrangement makes it possible to reduce the gap between the arrival time of video-audio data from the first source apparatus and the arrival time of video-audio data from the second source apparatus.

<Process Performed by Wireless Network Projector System>

Figure 5:
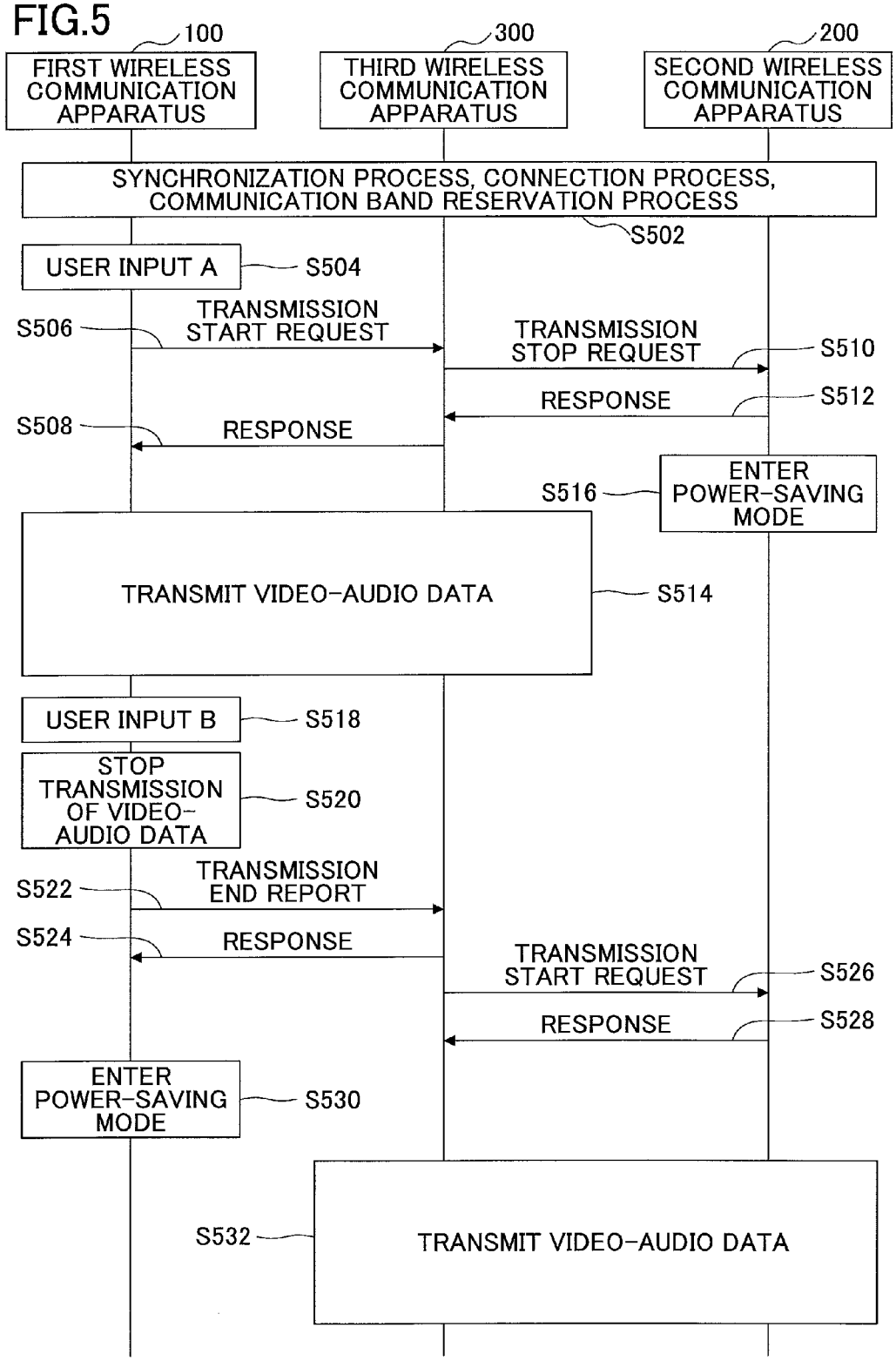
FIG. 5 is a sequence chart illustrating an exemplary process performed by a wireless network projector system.

FIG. 5 is a sequence chart illustrating an exemplary process performed by the wireless network projector system.

In the example of FIG. 5, a user input is performed on the first wireless communication apparatus 100 to switch sources of video-audio data. The user can switch sources of video-audio data from the first wireless communication apparatus 100 to the second wireless communication apparatus 200 without moving to the location where the second wireless communication apparatus 200 or the third wireless communication apparatus 300 is installed.

At step S502, a synchronization process, a connection process, and a communication band reservation process for wireless communications are performed between the first wireless communication apparatus 100, the second wireless communication apparatus 200, and the third wireless communication apparatus 300. The synchronization process, the connection process, the communication band reservation process are performed according to a standard used among the first wireless communication apparatus 100, the second wireless communication apparatus 200, and the third wireless communication apparatus 300. For example, these processes are performed according to a standard such as WiMedia or IEEE 802.15.3c.

At step S504, a user input A is input to the first wireless communication apparatus 100. For example, the user input A may be detected when the button switch of the user input device 104 of the first wireless communication apparatus 100 is pressed for a time period that is less than a predetermined time period. As another example, the user input A may be detected when the number of times that the button switch of the user input device 104 of the first wireless communication apparatus 100 is pressed is different from a predetermined number of times.

At step S506, the first wireless communication apparatus 100 transmits a transmission start request to the third wireless communication apparatus 300.

At step S508, the third wireless communication apparatus 300 transmits a response to the transmission start request to the first wireless communication apparatus 100.

At step S510, the third wireless communication apparatus 300 transmits a transmission stop request to the second wireless communication apparatus 200.

At step S512, the second wireless communication apparatus 200 transmits a response to the transmission stop request to the third wireless communication apparatus 300.

Thus, when the transmission start request is transmitted from the first wireless communication apparatus 100 to the third wireless communication apparatus 300, control data is exchanged between the third wireless communication apparatus 300 and the second wireless communication apparatus 200, and transmission of video-audio data from the second wireless communication apparatus 200 is stopped.

FIG. 6 illustrates exemplary messages transmitted at steps S506, S508, S510, and S512.

In FIG. 6, MAC addresses of the first wireless communication apparatus 100, the second wireless communication apparatus 200, and the third wireless communication apparatus 300 are indicated by MAC address 1, MAC address 2, and MAC address 3, respectively. Also in FIG. 6, information indicating the transmission start request, information indicating the transmission stop request, information indicating the transmission end report, and information indicating the response are all represented by one bit. A message including a sender MAC address, a destination MAC address, and one of the information indicating the transmission start request, the information indicating the transmission stop request, the information indicating the transmission end report, and the information indicating the response is transmitted between the first wireless communication apparatus 100, the second wireless communication apparatus 200, and the third wireless communication apparatus 300. A recipient of the message can determine the meaning of the message based on the information included in the message.

At step S514, the first wireless communication apparatus 100 transmits video-audio data to the third wireless communication apparatus 300. The first wireless communication apparatus 100 transmits video-audio data according to a standard used among the first wireless communication apparatus 100, the second wireless communication apparatus 200, and the third wireless communication apparatus 300. For example, the first wireless communication apparatus 100 transmits video-audio data according to a standard such as WiMedia or IEEE 802.15.3c. More specifically, the first wireless communication apparatus 100 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

At step S516, the second wireless communication apparatus 200 enters a power-saving mode because the second wireless communication apparatus 200 is not going to transmit video-audio data. For example, the second wireless communication apparatus 200 enters the power-saving mode by gating hardware clocks. That is, when the video-audio input processing unit 202 is implemented as a hardware component, the second wireless communication apparatus 200 stops supplying clocks and/or power to the video-audio input processing unit 202.

At step S518, a user input B is input to the first wireless communication apparatus 100. For example, the user input B may be detected when the button switch of the user input device 104 of the first wireless communication apparatus 100 is pressed for a time period that is greater than a predetermined time period. As another example, the user input B may be detected when the button switch of the user input device 104 of the first wireless communication apparatus 100 is pressed a predetermined number of times.

At step S520, the first wireless communication apparatus 100 stops transmitting the video-audio data.

At step S522, the first wireless communication apparatus 100 transmits a transmission end report to the third wireless communication apparatus 300.

At step S524, the third wireless communication apparatus 300 transmits a response to the transmission end report to the first wireless communication apparatus 100.

At step S526, the third wireless communication apparatus 300 transmits a transmission start request to the second wireless communication apparatus 200. The third wireless communication apparatus 300 causes the second wireless communication apparatus 200 to return from the power-saving mode to an operation mode by using synchronization data (beacon).

At step S528, the second wireless communication apparatus 200 transmits a response to the transmission start request to the third wireless communication apparatus 300.

FIG. 7 illustrates exemplary messages transmitted at steps S522, S524, S526, and S528.

In FIG. 7, MAC addresses of the first wireless communication apparatus 100, the second wireless communication apparatus 200, and the third wireless communication apparatus 300 are indicated by MAC address 1, MAC address 2, and MAC address 3, respectively. Also in FIG. 6, information indicating the transmission start request, information indicating the transmission stop request, information indicating the transmission end report, and information indicating the response are all represented by one bit. A message including a sender MAC address, a destination MAC address, and one of the information indicating the transmission start request, the information indicating the transmission stop request, the information indicating the transmission end report, and the information indicating the response is transmitted between the first wireless communication apparatus 100, the second wireless communication apparatus 200, and the third wireless communication apparatus 300. A recipient of the message can determine the meaning of the message based on the information included in the message.

At step S530, the first wireless communication apparatus 100 enters a power-saving mode because the first wireless communication apparatus 100 is not going to transmit video-audio data. For example, the first wireless communication apparatus 100 enters the power-saving mode by gating hardware clocks. That is, when the video-audio input processing unit 102 is implemented as a hardware component, the first wireless communication apparatus 100 stops supplying clocks and/or power to the video-audio input processing unit 102.

At step S532, the second wireless communication apparatus 200 transmits video-audio data to the third wireless communication apparatus 300. The second wireless communication apparatus 200 transmits video-audio data according to a standard used among the first wireless communication apparatus 100, the second wireless communication apparatus 200, and the third wireless communication apparatus 300. For example, the second wireless communication apparatus 200 transmits video-audio data according to a standard such as WiMedia or IEEE 802.15.3c. More specifically, the second wireless communication apparatus 200 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

The wireless network projector system of the present embodiment may also be configured such that video-audio data is output alternately (or in sequence) from the first wireless communication apparatus 100 and the second wireless communication apparatus 200 when the button switch of the user input device 104 is rotated, while being pressed, at steps S504 and S518.

The order of steps of FIG. 5 is just an example, and the steps may be performed in a different order.

With the wireless network projector system of the present embodiment, the user can switch wireless communication apparatuses from which video-audio data is output by operating one of the wireless communication apparatuses. This configuration enables the user to switch sources of video-audio data from a wireless communication apparatus to another wireless communication apparatus without moving to the location where the other wireless communication apparatus is installed. In other words, the present embodiment makes it possible to switch audio-visual apparatuses from which data is wirelessly transmitted, by using an input device of one of the audio-visual apparatuses.

<Variation>

Figure 8:
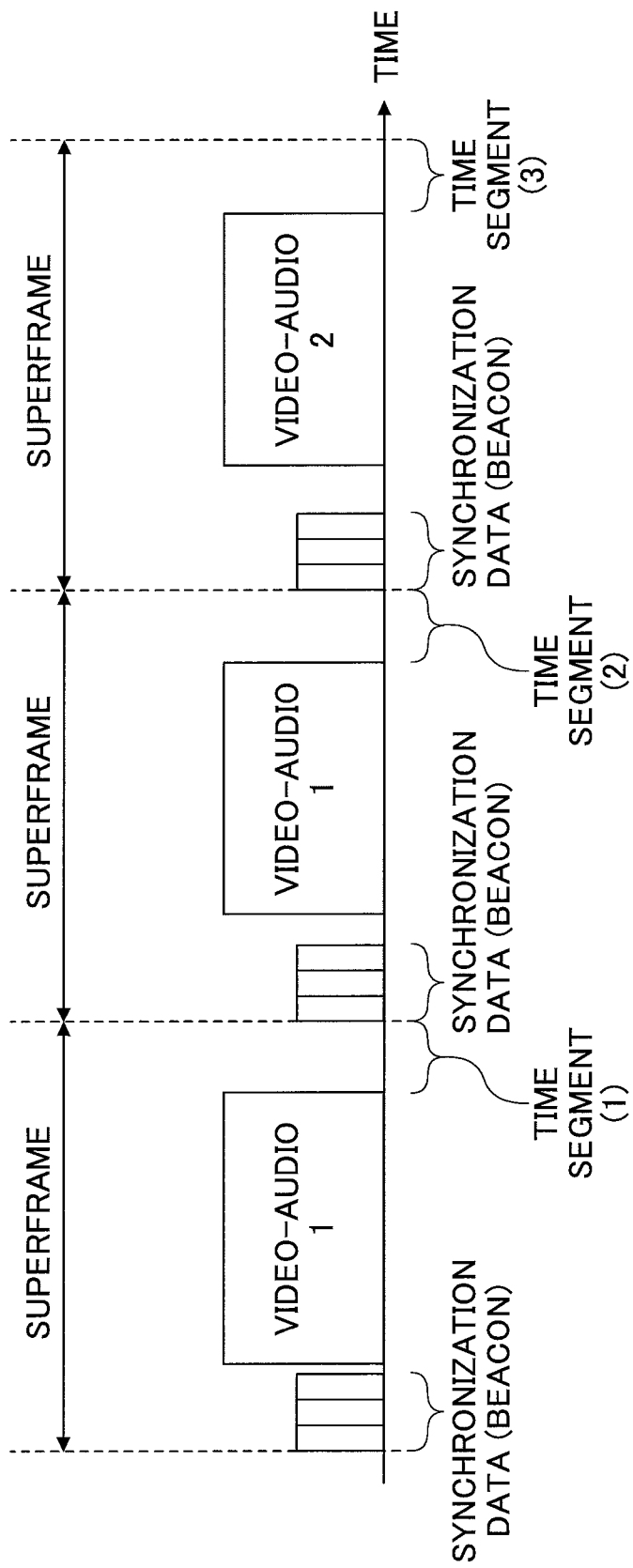
FIG. 8 is a drawing used to describe a third transmission-reception method for a wireless network projector system.

FIG. 8 is a drawing used to describe a third transmission-reception method for the wireless network projector system.

In FIG. 8, the horizontal axis indicates time. In a time division multiple access method of the present embodiment, the first wireless communication apparatus 100, the second wireless communication apparatus 200, and the third wireless communication apparatus 300 participating in the network transmit synchronization data (beacons) at a constant time interval. The constant time interval (or constant time period) may be referred to as a "superframe". The synchronization data is transmitted by the first wireless communication apparatus 100, the second wireless communication apparatus 200, and the third wireless communication apparatus 300 to, for example, participate in the network and perform a band reservation negotiation process for data communications.

In the first and second exemplary transmission-reception methods described above with reference to FIGS. 3 and 4, time segments where the first and second wireless communication apparatuses 100 and 200 can transmit video-audio data are set in advance in each superframe.

In the third transmission-reception method for the wireless network projector system, after video-audio data is transmitted in a superframe, the release and reservation of communication bands are performed using a control frame or synchronization data.

In the example of FIG. 8, the release and reservation of communication bands can be performed in time segments (1), (2), and (3).

For example, after transmission of video-audio data from the first wireless communication apparatus 100 to the third wireless communication apparatus 300 is stopped, in time segment (2), control frames are transmitted and received between the first wireless communication apparatus 100 and the third wireless communication apparatus 300 to release a communication band. Also in time segment (2), control frames are transmitted and received between the first wireless communication apparatus 100 and the second wireless communication apparatus 200 to reserve a communication band. With the third transmission-reception method, wireless communications can be performed between the third wireless communication apparatus 300 and one of the first wireless communication apparatus 100 and the second wireless communication apparatus 200 in each superframe. This method makes it possible to transmit a large amount of video-audio data while controlling time segments.

<Process Performed by Wireless Network Projector System>

Figure 9:
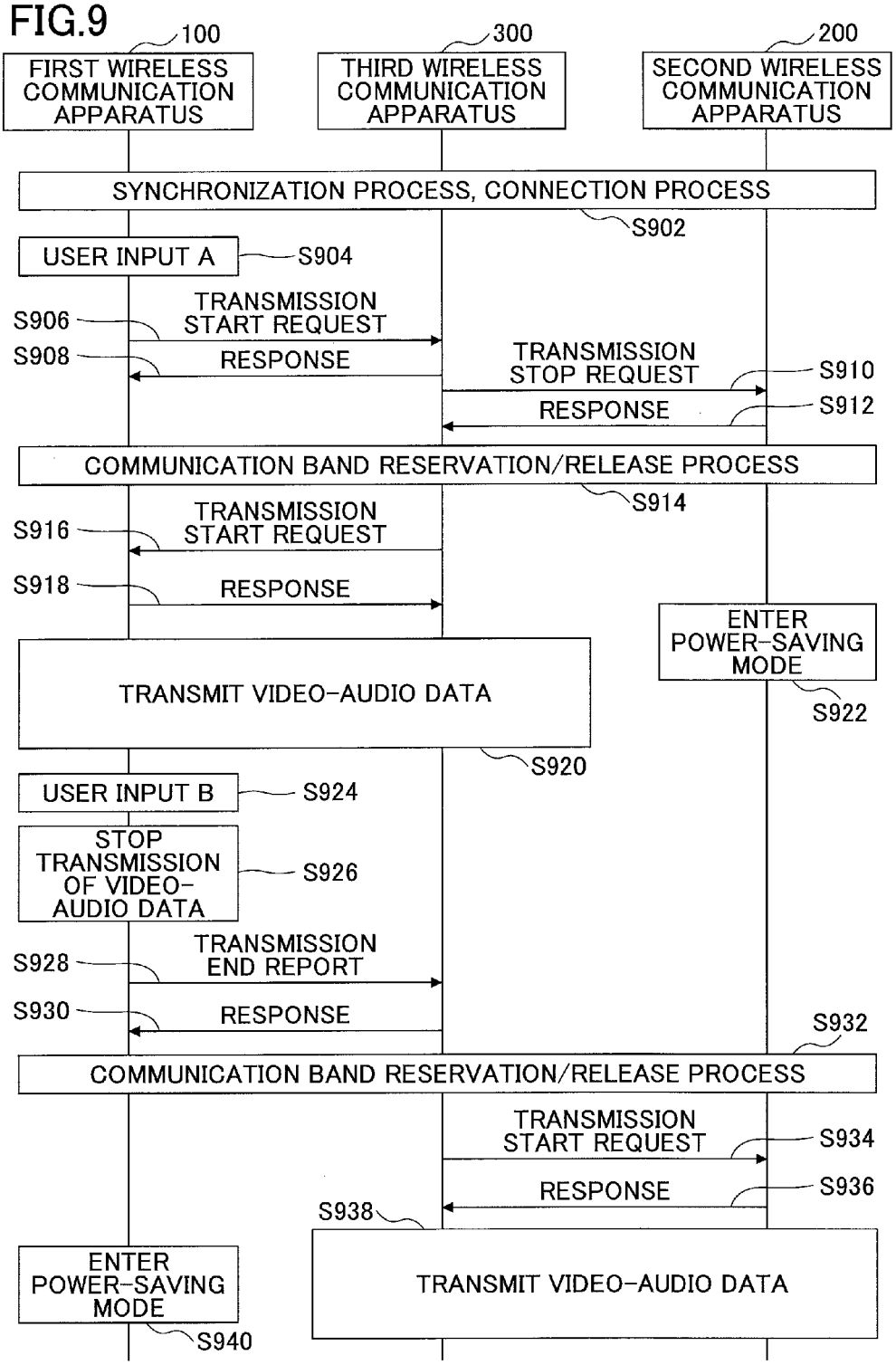
FIG. 9 is a sequence chart illustrating a variation of a process performed by a wireless network projector system.

FIG. 9 is a sequence chart illustrating a variation of a process performed by the wireless network projector system.

In the example of FIG. 9, a user input is performed on the first wireless communication apparatus 100 to switch sources of video-audio data. The user can switch sources of video-audio data from the first wireless communication apparatus 100 to the second wireless communication apparatus 200 without moving to a location where the second wireless communication apparatus 200 or the third wireless communication apparatus 300 is installed.

At step S902, a synchronization process and a connection process for wireless communications are performed between the first wireless communication apparatus 100, the second wireless communication apparatus 200, and the third wireless communication apparatus 300. The synchronization process and the connection process are performed according to a standard used among the first wireless communication apparatus 100, the second wireless communication apparatus 200, and the third wireless communication apparatus 300. For example, the processes are performed according to a standard such as WiMedia or IEEE 802.15.3c.

At step S904, a user input A is input to the first wireless communication apparatus 100. For example, the user input A may be detected when the button switch of the user input device 104 of the first wireless communication apparatus 100 is pressed for a time period that is less than a predetermined time period. As another example, the user input A may be detected when the number of times that the button switch of the user input device 104 of the first wireless communication apparatus 100 is pressed is different from a predetermined number of times.

At step S906, the first wireless communication apparatus 100 transmits a transmission start request to the third wireless communication apparatus 300.

At step S908, the third wireless communication apparatus 300 transmits a response to the transmission start request to the first wireless communication apparatus 100.

At step S910, the third wireless communication apparatus 300 transmits a transmission stop request to the second wireless communication apparatus 200.

At step S912, the second wireless communication apparatus 200 transmits a response to the transmission stop request to the third wireless communication apparatus 300.

At step S914, a communication band reservation process and a communication band release process are performed between the first wireless communication apparatus 100, the second wireless communication apparatus 200, and the third wireless communication apparatus 300. For example, a communication band reservation process is performed between the first wireless communication apparatus 100 and the third wireless communication apparatus 300. Also, a communication band release process is performed between the second wireless communication apparatus 200 and the third wireless communication apparatus 300.

At step S916, the third wireless communication apparatus 300 transmits a transmission start request to the first wireless communication apparatus 100.

At step S918, the first wireless communication apparatus 100 transmits a response to the transmission start request to the third wireless communication apparatus 300.

At step S920, the first wireless communication apparatus 100 transmits video-audio data according to a standard used among the first wireless communication apparatus 100, the second wireless communication apparatus 200, and the third wireless communication apparatus 300. For example, the first wireless communication apparatus 100 transmits video-audio data according to a standard such as WiMedia or IEEE 802.15.3c. More specifically, the first wireless communication apparatus 100 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

At step S922, the second wireless communication apparatus 200 enters a power-saving mode because the second wireless communication apparatus 200 is not going to transmit video-audio data. For example, the second wireless communication apparatus 200 enters the power-saving mode by gating hardware clocks. That is, when the video-audio input processing unit 202 is implemented as a hardware component, the second wireless communication apparatus 200 stops supplying clocks and/or power to the video-audio input processing unit 202.

At step S924, a user input B is input to the first wireless communication apparatus 100. For example, the user input B may be detected when the button switch of the user input device 104 of the first wireless communication apparatus 100 is pressed for a time period that is greater than a predetermined time period. As another example, the user input B may be detected when the button switch of the user input device 104 of the first wireless communication apparatus 100 is pressed a predetermined number of times.

At step S926, the first wireless communication apparatus 100 stops transmitting the video-audio data.

At step S928, the first wireless communication apparatus 100 transmits a transmission end report to the third wireless communication apparatus 300.

At step S930, the third wireless communication apparatus 300 transmits a response to the transmission end report to the first wireless communication apparatus 100.

At step S932, a communication band reservation process and a communication band release process are performed between the first wireless communication apparatus 100, the second wireless communication apparatus 200, and the third wireless communication apparatus 300. For example, a communication band release process is performed between the first wireless communication apparatus 100 and the third wireless communication apparatus 300. Also, a communication band reservation process is performed between the second wireless communication apparatus 200 and the third wireless communication apparatus 300.

At step S934, the third wireless communication apparatus 300 transmits a transmission start request to the second wireless communication apparatus 200. The third wireless communication apparatus 300 causes the second wireless communication apparatus 200 to return from the power-saving mode to an operation mode by using synchronization data (beacon).

At step S936, the second wireless communication apparatus 200 transmits a response to the transmission start request to the third wireless communication apparatus 300.

At step S938, the second wireless communication apparatus 200 transmits video-audio data according to a standard used among the first wireless communication apparatus 100, the second wireless communication apparatus 200, and the third wireless communication apparatus 300. For example, the second wireless communication apparatus 200 transmits video-audio data according to a standard such as WiMedia or IEEE 802.15.3c. More specifically, the second wireless communication apparatus 200 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

At step S940, the first wireless communication apparatus 100 enters a power-saving mode because the first wireless communication apparatus 100 is not going to transmit video-audio data. For example, the first wireless communication apparatus 100 enters the power-saving mode by gating hardware clocks. That is, when the video-audio input processing unit 102 is implemented as a hardware component, the first wireless communication apparatus 100 stops supplying clocks and/or power to the video-audio input processing unit 102.

The wireless network projector system of the present embodiment may also be configured such that video-audio data is output alternately (or in sequence) from the first wireless communication apparatus 100 and the second wireless communication apparatus 200 when the button switch of the user input device 104 is rotated, while being pressed, at steps S904 and S924.

The order of steps of FIG. 9 is just an example, and the steps may be performed in a different order.

Thus, in the method of FIG. 9, communication bands are released and reserved each time sources of video-audio data are switched between the first wireless communication apparatus 100 and the second wireless communication apparatus 200. Compared with a method where communication bands are predetermined and fixed, the method of FIG. 9 makes it possible to use a wider frequency band as well as to control timing for inputting and outputting video-audio data.

<Operations of First Wireless Communication Apparatus>

Figure 10:
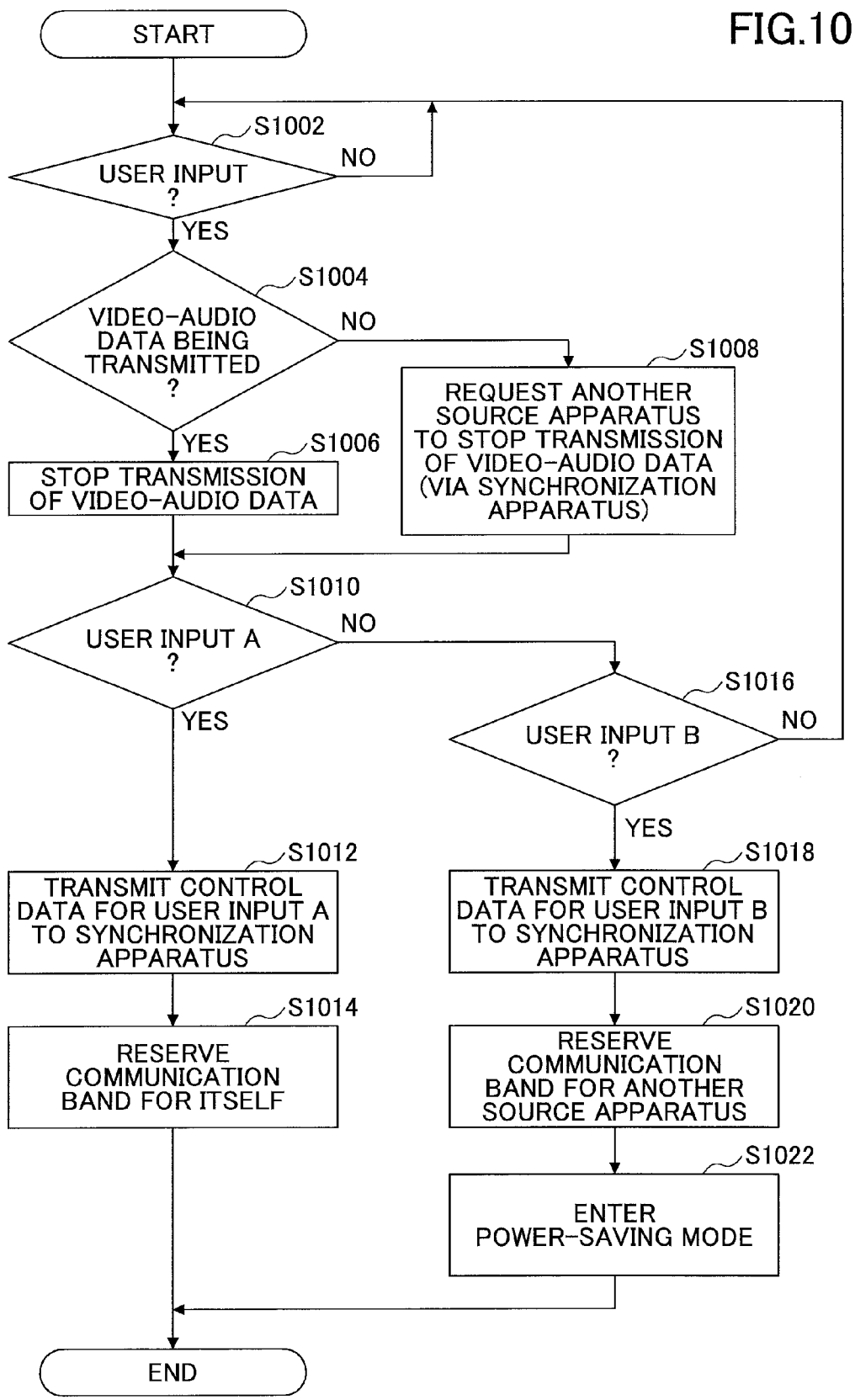
FIG. 10 is a flowchart illustrating exemplary operations of a first wireless communication apparatus.

FIG. 10 is a flowchart illustrating exemplary operations of the first wireless communication apparatus 100. Operations of the second wireless communication apparatus 200 are substantially the same as those of the first wireless communication apparatus 100, and therefore their descriptions are omitted here.

At step S1002, the first wireless communication apparatus 100 determines whether a user input has been received. When no user input has been received (NO at step S1002), step S1002 is repeated.

When a user input has been received (YES at step S1002), the process proceeds to step S1004. At step S1004, the first wireless communication apparatus 100 determines whether it is transmitting video-audio data.

When video-audio data is being transmitted (YES at step S1004), the process proceeds to step S1006. At step S1006, the first wireless communication apparatus 100 stops transmitting video-audio data.

When video-audio data is not being transmitted (NO at step S1004), the process proceeds to step S1008. At step S1008, the first wireless communication apparatus 100 requests another source apparatus to stop transmission of video-audio data. More specifically, the first wireless communication apparatus 100 transmits, via the third wireless communication apparatus 300 to the second wireless communication apparatus 200, a transmission stop request that requests the second wireless communication apparatus 200 to stop transmission of video-audio data.

After the transmission of video-audio data is stopped at step S1006 or the transmission of video-audio data by another source apparatus is stopped at step S1008, the process proceeds to step S1010. At step S1010, the first wireless communication apparatus 100 determines whether the user input is a user input A.

When the user input is the user input A (YES at step S1010), the process proceeds to step S1012. At step S1012, the first wireless communication apparatus 100 transmits control data for the user input A to the synchronization apparatus. The control data for the user input A is, for example, a transmission start request.

At step S1014, the first wireless communication apparatus 100 reserves a communication band for transmission of video-audio data from the first wireless communication apparatus 100.

When the user input is not the user input A (NO at step S1010), the process proceeds to step S1016. At step S1016, the first wireless communication apparatus 100 determines whether the user input is a user input B. When the user input is not the user input B (NO at step S1016), the process returns to step S1002.

When the user input is the user input B (YES at step S1016), the process proceeds to step S1018. At step S1018, the first wireless communication apparatus 100 transmits control data for the user input B to the synchronization apparatus. The control data for the user input B is, for example, a transmission end report.

At step S1020, the first wireless communication apparatus 100 reserves a communication band for another source apparatus that is to transmit video-audio data.

At step S1022, the first wireless communication apparatus 100 enters a power-saving mode.

The order of steps of FIG. 10 is just an example, and the steps may be performed in a different order.

<Operations of Third Wireless Communication Apparatus>

Figure 11:
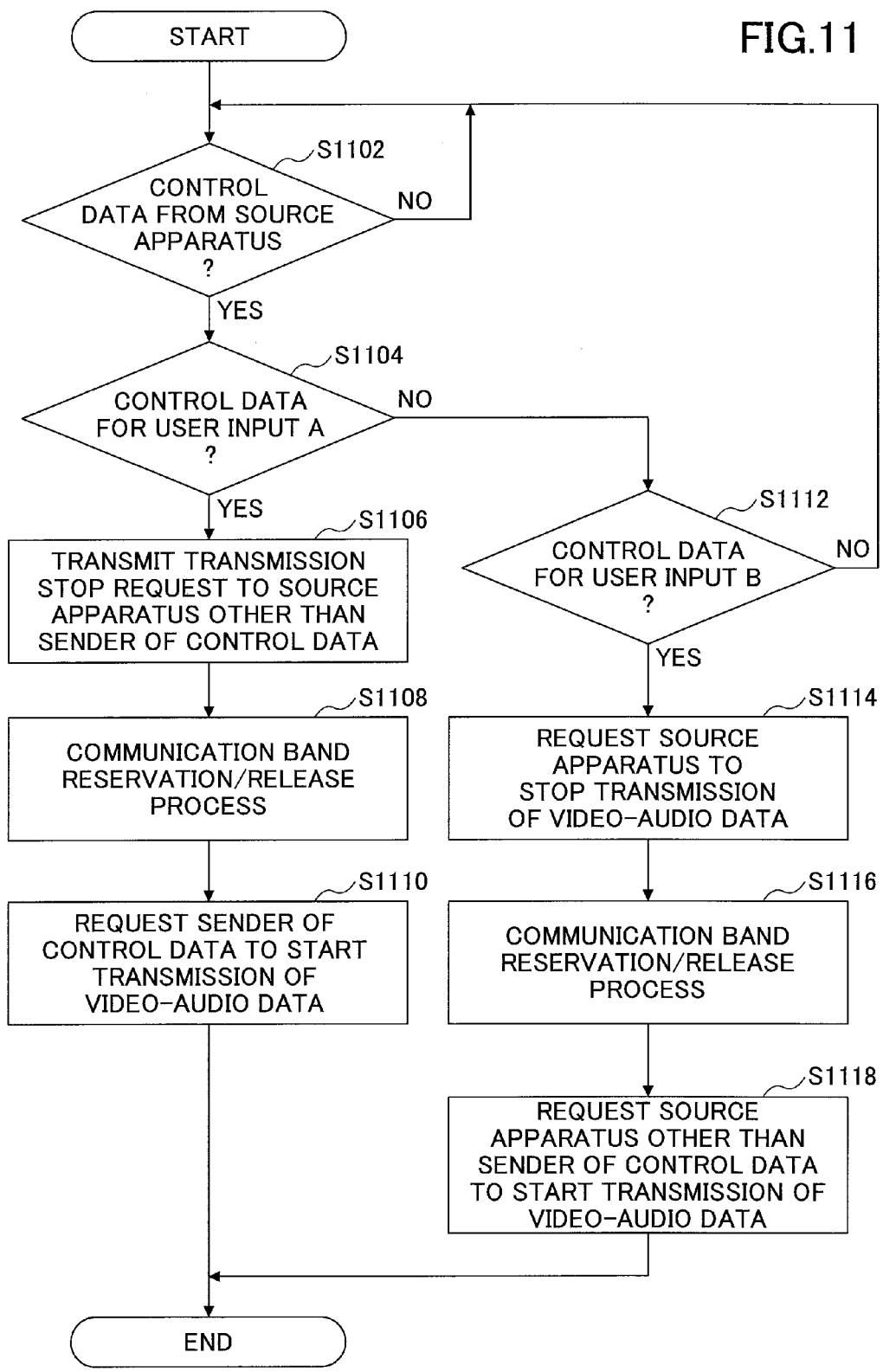
FIG. 11 is a flowchart illustrating exemplary operations of a third wireless communication apparatus.

FIG. 11 is a flowchart illustrating exemplary operations of the third wireless communication apparatus 300.

At step S1102, the third wireless communication apparatus 300 determines whether control data has been received from a source apparatus. When no control data has been received from a source apparatus (NO at step S1102), step S1102 is repeated.

When control data has been received from a source apparatus (YES at step S1102), the process proceeds to step S1104. At step S1104, the third wireless communication apparatus 300 determines whether the control data is for a user input A.

When the control data is for the user input A (YES at step S1104), the process proceeds to step S1106. At step S1106, the third wireless communication apparatus 300 transmits a transmission stop request to a wireless communication apparatus other than the sender of the control data for the user input A.

At step S1108, the third wireless communication apparatus 300 performs a communication band release process and a communication band reservation process with the first wireless communication apparatus 100 and the second wireless communication apparatus 200.

At step S1110, the third wireless communication apparatus 300 requests the sender of the control data for the user input B to start transmission of video-audio data.

When the control data is not for the user input A (NO at step S1104), the process proceeds to step S1112. At step S1112, the third wireless communication apparatus 300 determines whether the control data is for a user input B. When the control data is not for the user input B (NO at step S1112), the process returns to step S1102.

When the control data is for the user input B (YES at step S1112), the process proceeds to step S1114. At step S1114, the third wireless communication apparatus 300 requests a source apparatus transmitting video-audio data to stop the transmission of the video-audio data.

At step S1116, the third wireless communication apparatus 300 performs a communication band release process and a communication band reservation process with the first wireless communication apparatus 100 and the second wireless communication apparatus 200.

At step S1118, the third wireless communication apparatus 300 requests a source apparatus other than the sender of the control data for the user input B to start transmission of video-audio data.

The order of steps of FIG. 11 is just an example, and the steps may be performed in a different order.

<<Second Embodiment>>
<Communication System>

Figure 12:
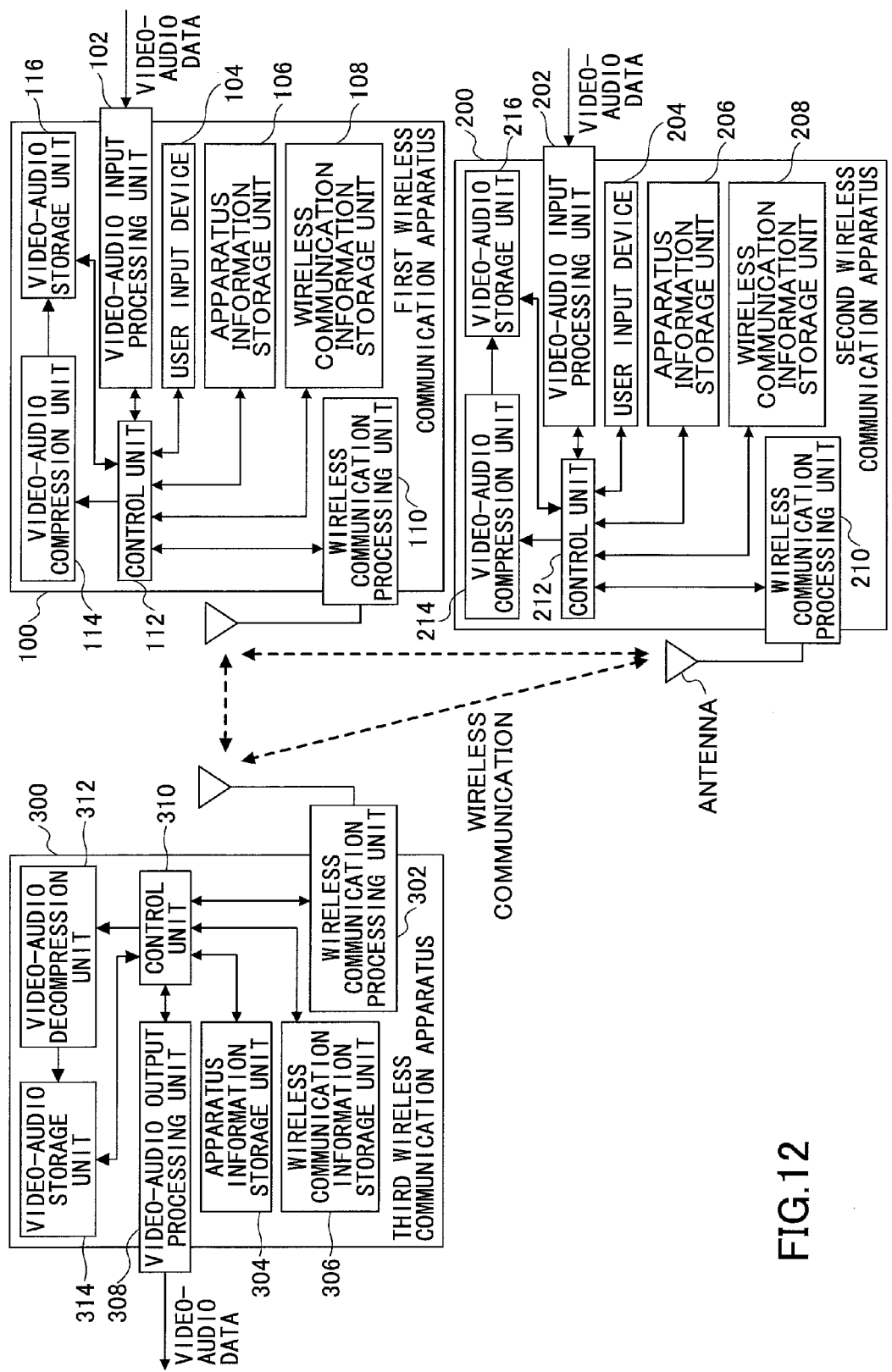
FIG. 12 is a drawing illustrating another exemplary configuration of a communication system.

FIG. 12 is a drawing illustrating another exemplary configuration of a communication system. FIG. 12 illustrates a wireless network projector system as an example of a communication system.

<First Wireless Communication Apparatus>

The first wireless communication apparatus 100 of a second embodiment may include a video-audio compression unit 114 and a video-audio storage unit 116 in addition to the components of the first wireless communication apparatus 100 of the first embodiment illustrated by FIG. 1.

The video-audio compression unit 114 is connected to the control unit 112. The video-audio compression unit 114 compresses video-audio data input from the control unit 112. The video-audio compression unit 114 is preferably configured to perform a compression process according to H.264 or H.265. The video-audio compression unit 114 stores the compressed video-audio data in the video-audio storage unit 116.

The control unit 112 inputs video-audio data received from the video-audio input processing unit 102 to the video-audio compression unit 114 as necessary. Preferably, the control unit 112 may be configured to input video-audio data received from the video-audio input processing unit 102 to the video-audio compression unit 114 when a setting to compress video-audio data is present. The control unit 112 also performs a control process to transmit the compressed video-audio data in the video-audio storage unit 116 from the wireless communication processing unit 110.

The control unit 112 determines whether input information from the user input device 104 is a user input C. When the input information is the user input C, the control unit 112 stops the control process for transmitting the video-audio data, which is input from the video-audio input processing unit 102, from the wireless communication processing unit 110 to the third wireless communication apparatus 300. After stopping the control process for transmitting the video-audio data, the control unit 112 performs a control process to transmit, to the third wireless communication apparatus 300, a transmission end report indicating that the transmission of the video-audio data has been stopped. When the input information is the user input C and after the transmission end report is transmitted from the first wireless communication apparatus 100 to the third wireless communication apparatus 300, control information is exchanged between the third wireless communication apparatus 300 and each of the first wireless communication apparatus 100 and the second wireless communication apparatus 200. A communication band release process for releasing a communication band is performed between the third wireless communication apparatus 300 and the first wireless communication apparatus 100, and a communication band reservation process for newly reserving a communication band is performed between the third wireless communication apparatus 300 and each of the first wireless communication apparatus 100 and the second wireless communication apparatus 200.

The third wireless communication apparatus 300 transmits, to each of the first wireless communication apparatus 100 and the second wireless communication apparatus 200, a transmission start request that requests starting transmission of video-audio data. The control unit 112 performs a control process to transmit a response to the transmission start request to the third wireless communication apparatus 300.

The video-audio storage unit 116 is connected to the video-audio compression unit 114 and the control unit 112. The video-audio storage unit 116 is a buffer used when video-audio data is compressed. The video-audio storage unit 116 stores video-audio data compressed by the video-audio compression unit 114.

Configurations of the second wireless communication apparatus 200 are substantially the same as those of the first wireless communication apparatus 100, and therefore their descriptions are omitted here.

<Third Wireless Communication Apparatus>

The third wireless communication apparatus 300 of the second embodiment may include a video-audio decompression unit 312 and a video-audio storage unit 314 in addition to components of the third wireless communication apparatus 300 of the first embodiment illustrated by FIG. 1.

The video-audio decompression unit 312 is connected to the control unit 310. The video-audio compression unit 114 decompresses (or expands) compressed video-audio data input from the control unit 310. The video-audio decompression unit 312 is preferably configured to perform a decompression process according to H.264 or H.265. The video-audio decompression unit 312 stores the decompressed video-audio data in the video-audio storage unit 314.

The control unit 310 inputs video-audio data received from the wireless communication processing unit 302 to the video-audio decompression unit 312 as necessary. The control unit 310 also performs a control process to output the decompressed video-audio data in the video-audio storage unit 314 from the video-audio output processing unit 308.

When a transmission end report based on the user input C is received from the first wireless communication apparatus 100, the control unit 310 performs a control process to transmit a response to the transmission end report. After transmitting the response, the control unit 310 performs a communication band release process for releasing a communication band with the first wireless communication apparatus 100, and performs a communication band reservation process for newly reserving a communication band with each of the first wireless communication apparatus 100 and the second wireless communication apparatus 200. The control unit 310 also performs a control process to transmit a transmission start request to each of the first wireless communication apparatus 100 and the second wireless communication apparatus 200.

The video-audio storage unit 314 is connected to the video-audio decompression unit 312 and the control unit 310. The video-audio storage unit 314 is a buffer used when video-audio data is decompressed. The video-audio storage unit 314 stores video-audio data decompressed by the video-audio decompression unit 312.

In the wireless network projector system of the present embodiment, the first wireless communication apparatus 100 and the second wireless communication apparatus 200 are configured to compress video-audio data. This configuration makes it possible to reduce the size of video-audio data and thereby reduce the processing load of wireless communications. Also, reducing the size of video-audio data makes it possible to reduce a temporal delay in wireless communications even when the communication band is narrow.

The control unit 310 inputs sets of video-audio data received from the first wireless communication apparatus 100 and the second wireless communication apparatus 200 to the video-audio decompression unit 312. The video-audio decompression unit 312 decompresses the video-audio data received from each of the first wireless communication apparatus 100 and the second wireless communication apparatus 200, and stores the decompressed video-audio data in the video-audio storage unit 314. The video-audio decompression unit 312 may be configured to thin (or skip parts of) the decompressed video-audio data when storing the decompressed video-audio data in the video-audio storage unit 314. The video-audio decompression unit 310 combines the sets of decompressed video-audio data (from the first wireless communication apparatus 100 and the second wireless communication apparatus 200) in the video-audio storage unit 314, and transfers the sets of decompressed video-audio data at substantially the same time to the video-audio output processing unit 308.

Thus, according to the second embodiment, sets of video-audio data received from the first wireless communication apparatus 100 and the second wireless communication apparatus 200 are combined and transferred at substantially the same time to the video-audio output processing unit 308. This configuration makes it possible to display a video from the first wireless communication apparatus 100 and a video froth the second wireless communication apparatus 200 at substantially the same time on a display apparatus such as a monitor.

Also, when videos from the first wireless communication apparatus 100 and the second wireless communication apparatus 200 are obtained by cameras positioned slightly apart from each other in space and are slightly different from each other, the control unit 310 may be configured to combine the videos to generate a 3D video.

<Fourth Transmission-Reception Method for Wireless Network Projector System>

Figure 13:
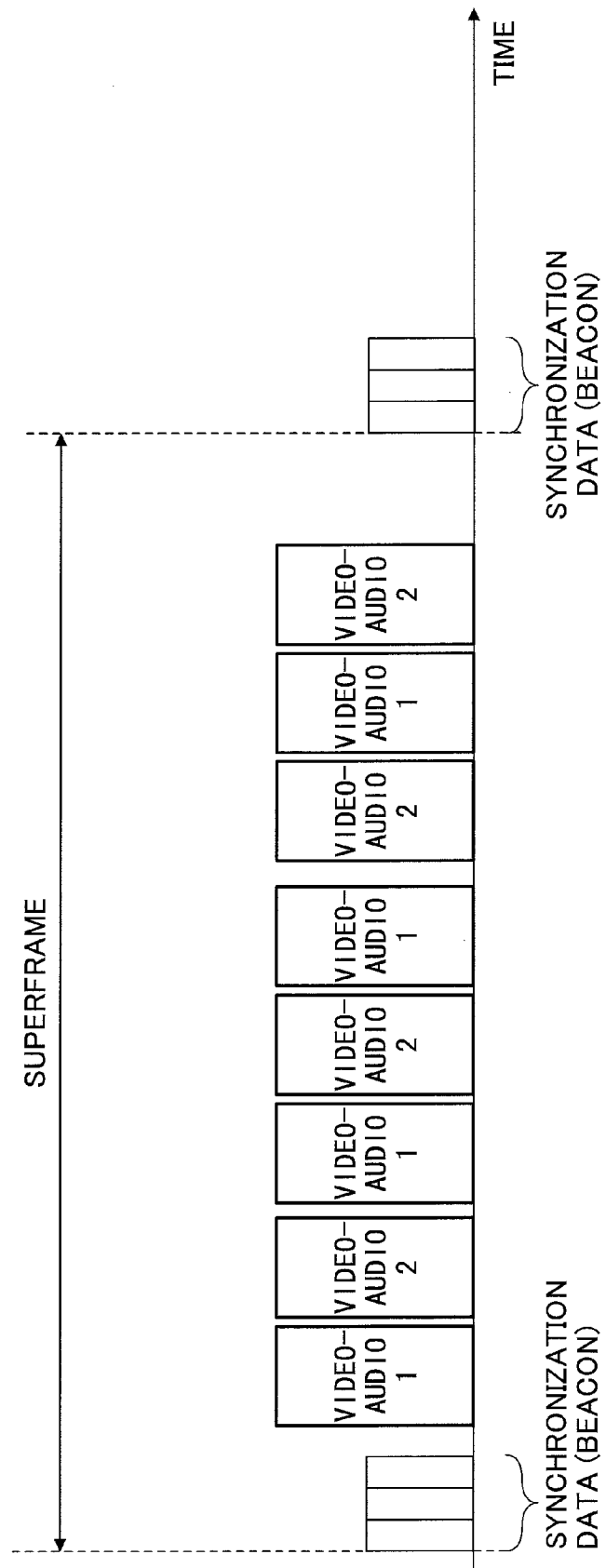
FIG. 13 is a drawing used to describe a fourth transmission-reception method for a wireless network projector system.

FIG. 13 is a drawing used to describe a third transmission-reception method for the wireless network projector system.

The first wireless communication apparatus 100, the second wireless communication apparatus 200, and the third wireless communication apparatus 300 are preferably configured to perform communications using the same frequency band according to time division multiple access (TDMA). The time division multiple access is used in WiMedia and millimeter-wave communication.

In FIG. 13, the horizontal axis indicates time. In a time division multiple access method of the present embodiment, the first wireless communication apparatus 100, the second wireless communication apparatus 200, and the third wireless communication apparatus 300 participating in the network transmit synchronization data (beacons) at a constant time interval. The constant time interval (or constant time period) may be referred to as a "superframe". The synchronization data is transmitted by the first wireless communication apparatus 100, the second wireless communication apparatus 200, and the third wireless communication apparatus 300 to, for example, participate in the network and perform a band reservation negotiation process for data communications.

In the fourth transmission-reception method for the wireless network projector system, video-audio data is transmitted from the first wireless communication apparatus 100 and the second wireless communication apparatus 200 at substantially the same time in each constant time interval represented by the superframe.

In the example of FIG. 13, the first source apparatus transmits video-audio data (video-audio 1) and the second source apparatus transmits video-audio data (video-audio 2) to the synchronization apparatus at substantially the same timing in the superframe.

<Process Performed by Wireless Network Projector System>

Figure 14:
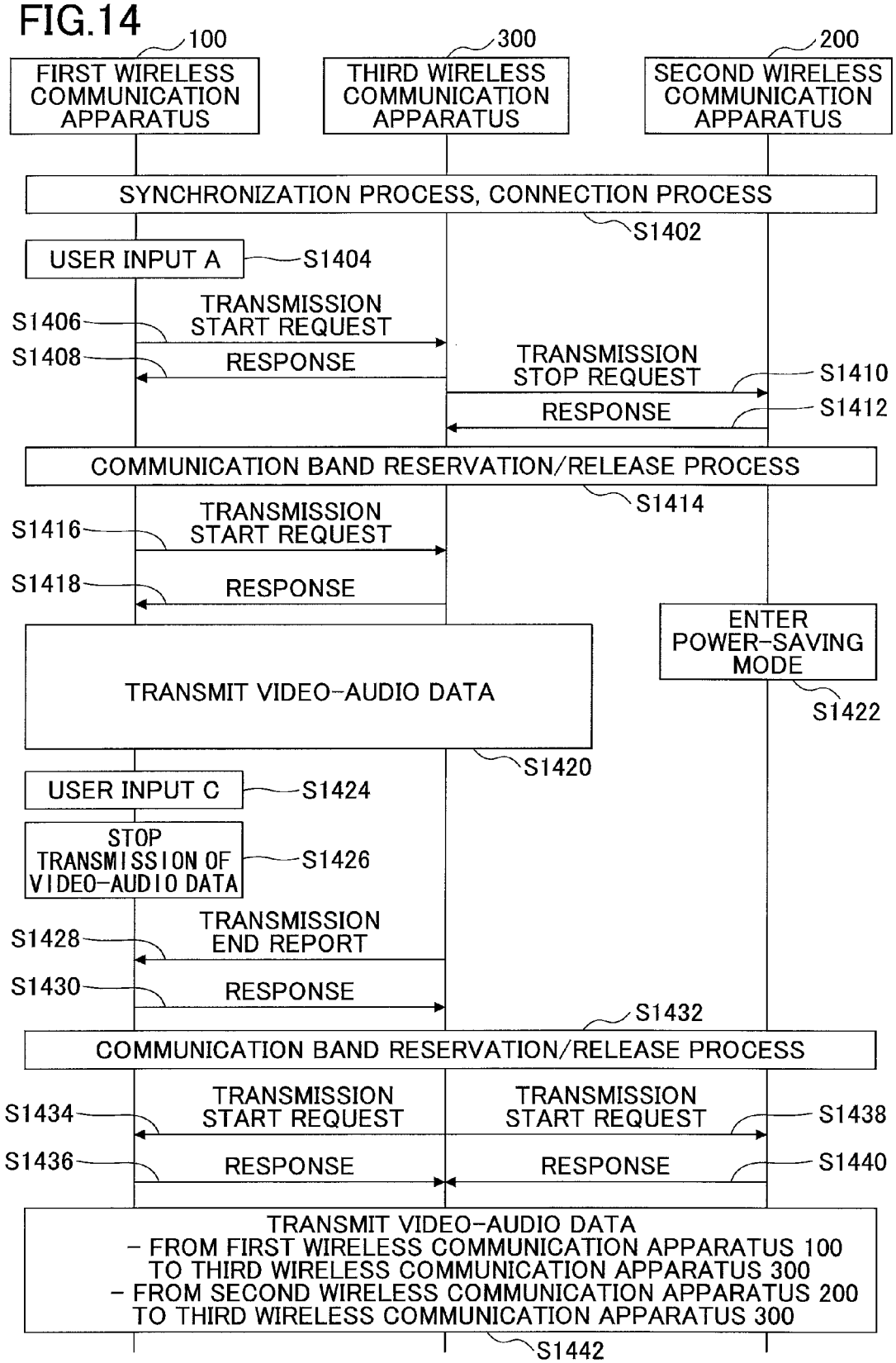
FIG. 14 is a sequence chart illustrating a variation of a process performed by a wireless network projector system.

FIG. 14 is a sequence chart illustrating a variation of a process performed by the wireless network projector system.

In the example of FIG. 14, a user input is performed on the first wireless communication apparatus 100 to cause the first wireless communication apparatus 100 to transmit a request for transmitting video-audio data from the first wireless communication apparatus 100 and the second wireless communication apparatus 200 at substantially the same time. The user can cause the first wireless communication apparatus 100 and the second wireless communication apparatus 200 to transmit video-audio data at substantially the same time without moving to a location where the second wireless communication apparatus 200 or the third wireless communication apparatus 300 is installed.

At step S1402, a synchronization process and a connection process for wireless communications are performed between the first wireless communication apparatus 100, the second wireless communication apparatus 200, and the third wireless communication apparatus 300. The synchronization process and the connection process are performed according to a standard used among the first wireless communication apparatus 100, the second wireless communication apparatus 200, and the third wireless communication apparatus 300. For example, these processes are performed according to a standard such as WiMedia or IEEE 802.15.3c.

At step S1404, a user input A is input to the first wireless communication apparatus 100. For example, the user input A may be detected when the button switch of the user input device 104 of the first wireless communication apparatus 100 is pressed for a time period that is less than a predetermined time period. As another example, the user input A may be detected when the number of times that the button switch of the user input device 104 of the first wireless communication apparatus 100 is pressed is different from a predetermined number of times.

At step S1406, the first wireless communication apparatus 100 transmits a transmission start request to the third wireless communication apparatus 300.

At step S1408, the third wireless communication apparatus 300 transmits a response to the transmission start request to the first wireless communication apparatus 100.

At step S1410, the third wireless communication apparatus 300 transmits a transmission stop request to the second wireless communication apparatus 200.

At step S1412, the second wireless communication apparatus 200 transmits a response to the transmission stop request to the third wireless communication apparatus 300.

At step S1414, a communication band reservation process and a communication band release process are performed between the first wireless communication apparatus 100, the second wireless communication apparatus 200, and the third wireless communication apparatus 300. For example, a communication band reservation process is performed between the first wireless communication apparatus 100 and the third wireless communication apparatus 300. Also, a communication band release process is performed between the second wireless communication apparatus 200 and the third wireless communication apparatus 300.

At step S1416, the third wireless communication apparatus 300 transmits a transmission start request to the first wireless communication apparatus 100.

At step S1418, the first wireless communication apparatus 100 transmits a response to the transmission start request to the third wireless communication apparatus 300.

At step S1420, the first wireless communication apparatus 100 transmits video-audio data according to a standard used among the first wireless communication apparatus 100, the second wireless communication apparatus 200, and the third wireless communication apparatus 300. For example, the first wireless communication apparatus 100 transmits video-audio data according to a standard such as WiMedia or IEEE 802.15.3c. More specifically, the first wireless communication apparatus 100 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

At step S1422, the second wireless communication apparatus 200 enters a power-saving mode because the second wireless communication apparatus 200 is not going to transmit video-audio data. For example, the second wireless communication apparatus 200 enters the power-saving mode by gating hardware clocks. That is, when the video-audio input processing unit 202 is implemented as a hardware component, the second wireless communication apparatus 200 stops supplying clocks and/or power to the video-audio input processing unit 202.

At step S1424, a user input C is input to the first wireless communication apparatus 100. For example, the user input C may be detected when the button switch of the user input device 104 of the first wireless communication apparatus 100 is pressed for a time period that is greater than a predetermined time period.

At step S1426, the first wireless communication apparatus 100 stops transmitting the video-audio data.

At step S1428, the first wireless communication apparatus 100 transmits a transmission end report to the third wireless communication apparatus 300.

At step S1430, the third wireless communication apparatus 300 transmits a response to the transmission end report to the first wireless communication apparatus 100.

At step S1432, a communication band reservation process and a communication band release process are performed between the first wireless communication apparatus 100, the second wireless communication apparatus 200, and the third wireless communication apparatus 300. For example, a communication band release process is performed between the first wireless communication apparatus 100 and the third wireless communication apparatus 300. Also, a communication band reservation process is performed between the third wireless communication apparatus 300 and each of the first wireless communication apparatus 100 and the second wireless communication apparatus 200.

At step S1434, the third wireless communication apparatus 300 transmits a transmission start request to the first wireless communication apparatus 100.

At step S1436, the first wireless communication apparatus 100 transmits a response to the transmission start request to the third wireless communication apparatus 300.

At step S1438, the third wireless communication apparatus 300 transmits a transmission start request to the second wireless communication apparatus 200.

At step S1440, the second wireless communication apparatus 200 transmits a response to the transmission start request to the third wireless communication apparatus 300.

At step S1442, each of the first wireless communication apparatus 100 and the second wireless communication apparatus 200 transmits video-audio data according to a standard used among the first wireless communication apparatus 100, the second wireless communication apparatus 200, and the third wireless communication apparatus 300. For example, the first wireless communication apparatus 100 and the second wireless communication apparatus 200 transmit video-audio data according to a standard such as WiMedia or IEEE 802.15.3c. More specifically, each of the first wireless communication apparatus 100 and the second wireless communication apparatus 200 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

The order of steps of FIG. 14 is just an example, and the steps may be performed in a different order.

Thus, in the method of FIG. 14, communication bands are released and reserved each time sources of video-audio data are switched between the first wireless communication apparatus 100 and the second wireless communication apparatus 200. Compared with a method where communication bands are predetermined and fixed, the method of FIG. 14 makes it possible to use a wider frequency band as well as to control timing for inputting and outputting video-audio data.

Also, when sets of video-audio data are transmitted at substantially the same time from the first wireless communication apparatus 100 and the second wireless communication apparatus 200, the third wireless communication apparatus 300 can combine the sets of video-audio data and output the combined video-audio data.

<<Third Embodiment>>
<Communication System>

Figure 15:
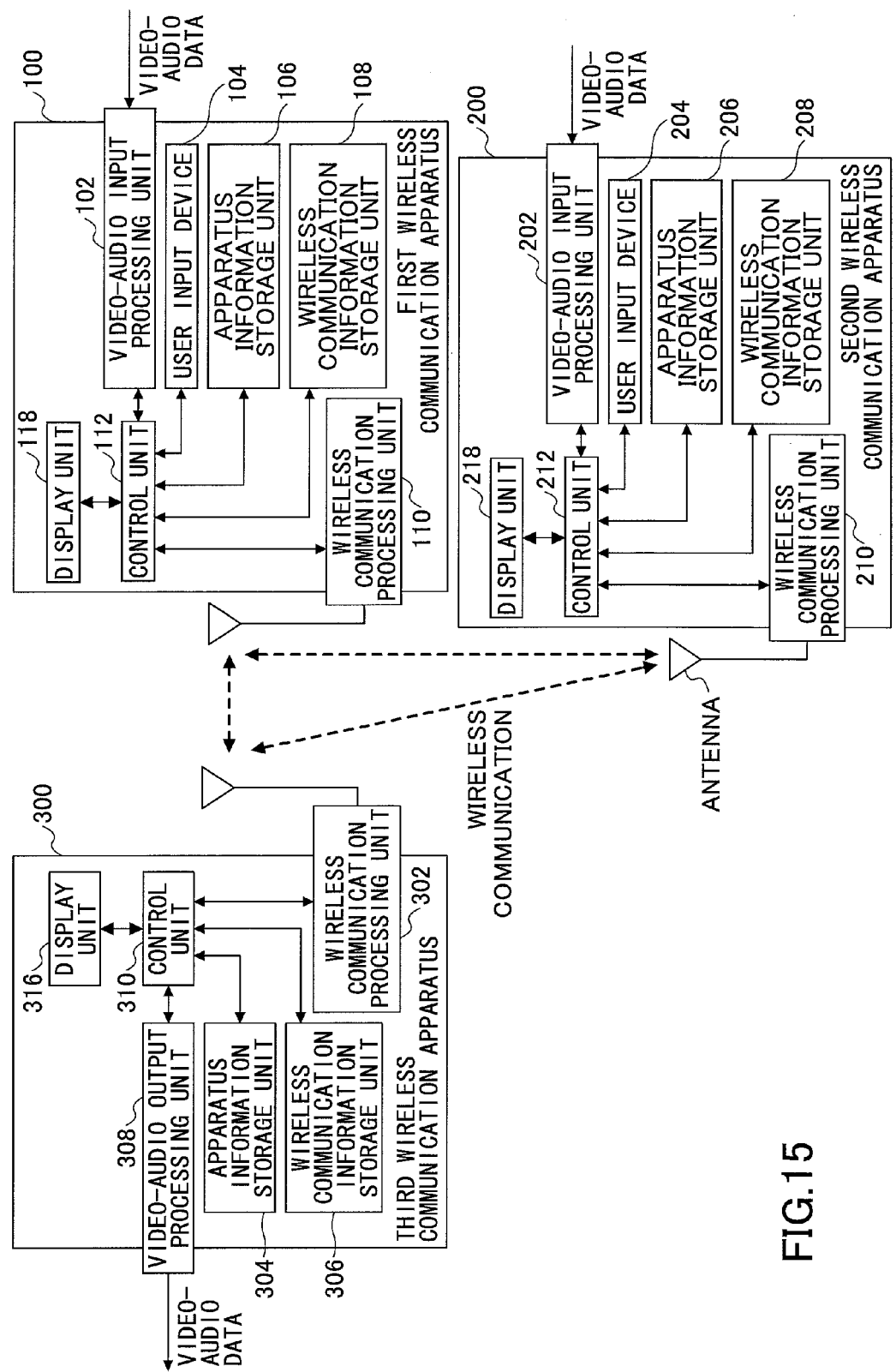
FIG. 15 is a drawing illustrating another exemplary configuration of a communication system.

FIG. 15 is a drawing illustrating another exemplary configuration of a communication system. FIG. 15 illustrates a wireless network projector system as an example of a communication system.

<First Wireless Communication Apparatus>

The first wireless communication apparatus 100 of a third embodiment may include a display unit 118 in addition to components of the first wireless communication apparatus 100 of the first embodiment illustrated by FIG. 1.

The display unit 118 is connected to the control unit 112. The display unit 118 displays information indicating operations performed on the user input device 104. For example, the display unit 118 displays information indicating that the button switch of the user input device 104 has been pressed for a time period that is greater than a predetermined time period. Also, the display unit 118 displays information indicating that the button switch of the user input device 104 has been pressed for a time period that is less than the predetermined time period.

The display unit 118 is preferably implemented by a light-emitting diode(s) (LED), a liquid crystal display (LCD), or a liquid crystal panel. Also, the display unit 118 may be implemented by a touch panel to provide functions of both of the user input unit 104 and the display unit 118.

Configurations of the second wireless communication apparatus 200 of the present embodiment are substantially the same as those of the first wireless communication apparatus 100, and therefore their descriptions are omitted here.

<Third Wireless Communication Apparatus>

The third wireless communication apparatus 300 of the third embodiment may include a display unit 316 in addition to components of the third wireless communication apparatus 300 of the first embodiment illustrated by FIG. 1.

The display unit 316 is connected to the control unit 310. The display unit 316 displays information indicating processes performed by the third wireless communication apparatus 300. For example, when video-audio data is being output from the video-audio output processing unit 308, the display unit 316 displays information indicating that video-audio data is being output.

The display unit 316 is preferably implemented by a light-emitting diode(s) (LED), a liquid crystal display (LCD), or a liquid crystal panel.

In the wireless network projector system of the present embodiment, the first wireless communication apparatus 100 and the second wireless communication apparatus 200 are configured to display information indicating operations performed on the user input device 104/204. This configuration enables a user to operate the first wireless communication apparatus 100 and the second wireless communication apparatus 200 while verifying performed operations. For example, the user can identify an error in an operation and perform the operation again. Also, with the third wireless communication apparatus 300 of the present embodiment, the user can examine processes being performed by the third wireless communication apparatus 300.

<Process Performed by Wireless Network Projector System>

Figure 16:
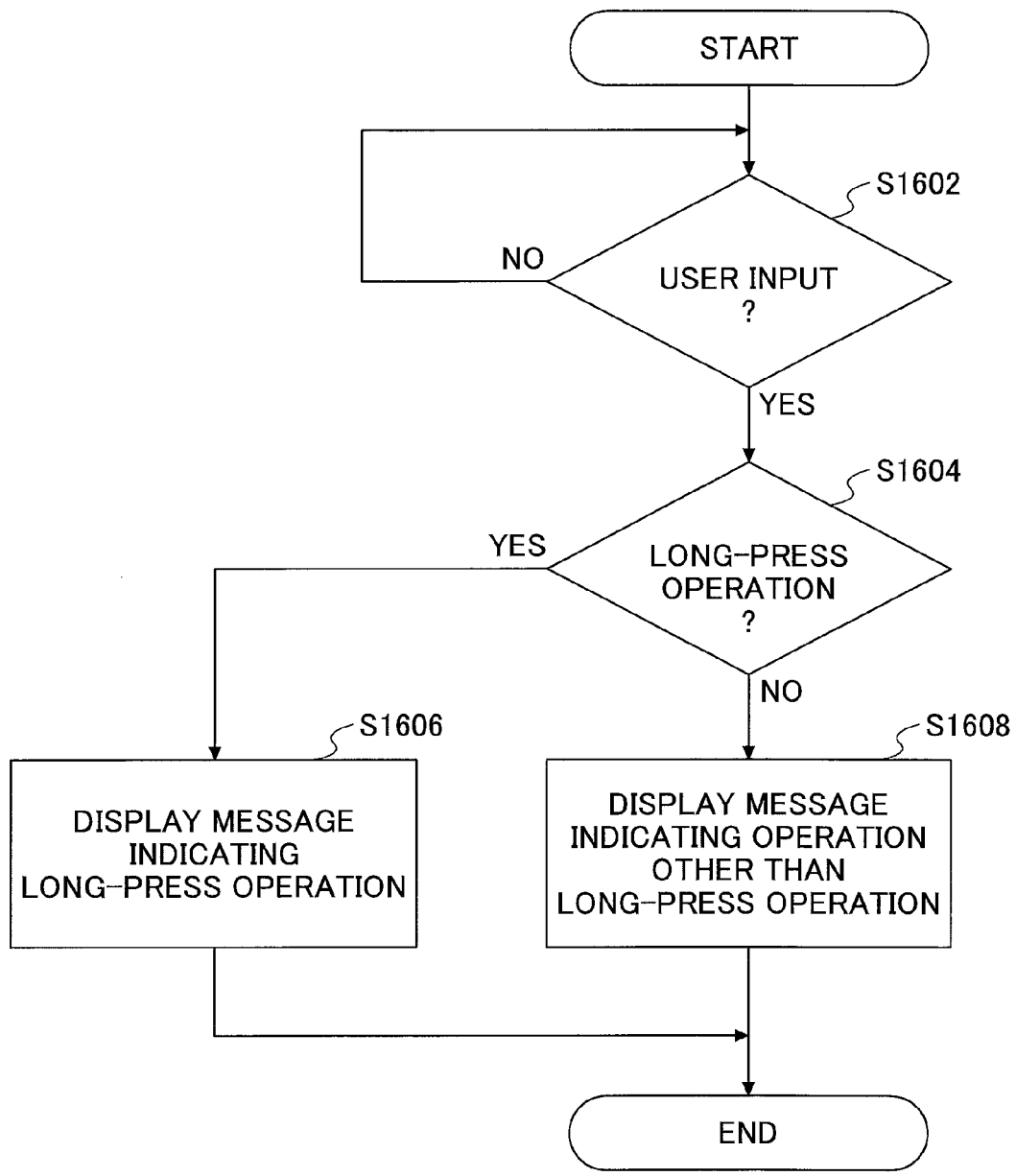
FIG. 16 is a flowchart illustrating a variation of a process performed by a wireless network projector system.

FIG. 16 is a sequence chart illustrating a variation of a process performed by the wireless network projector system.

In the example of FIG. 16, a user input is performed on the first wireless communication apparatus 100 and information indicating the user input is displayed.

At step S1602, the first wireless communication apparatus 100 determines whether a user input has been received. When no user input has been received, step S1602 is repeated.

When a user input has been received (YES at step S1602), the process proceeds to step S1604. At step S1604, the first wireless communication apparatus 100 determines whether the user input is a long-press operation (where the button switch is held down for a time period greater than a predetermined time period).

When the user input is a long-press operation (YES at step S1604), the process proceeds to step S1606. At step S1606, the first wireless communication apparatus 100 displays, on the display unit 118, information indicating that the long-press operation has been performed, and terminates the process.

When the user input is not a long-press operation (NO at step S1604), the process proceeds to step S1608. At step S1608, the first wireless communication apparatus 100 displays, on the display unit 118, information indicating that an operation other than the long-press operation has been performed, and terminates the process.

The first wireless communication apparatus 100 may be configured to also display, on the display unit 118, information indicating that video-audio data is being transmitted to the third wireless communication apparatus 300. Also, the first wireless communication apparatus 100 may be configured to display, on the display unit 118, information indicating the communication quality such as a transmission rate of video-audio data being transmitted to the third wireless communication apparatus 300. Further, the first wireless communication apparatus 100 may be configured to display, on the display unit 118, information indicating video quality of video-audio data being transmitted to the third wireless communication apparatus 300. The video quality may be represented by a parameter such as video resolution.

<<Fourth Embodiment>>
<Communication System>

Figure 17:
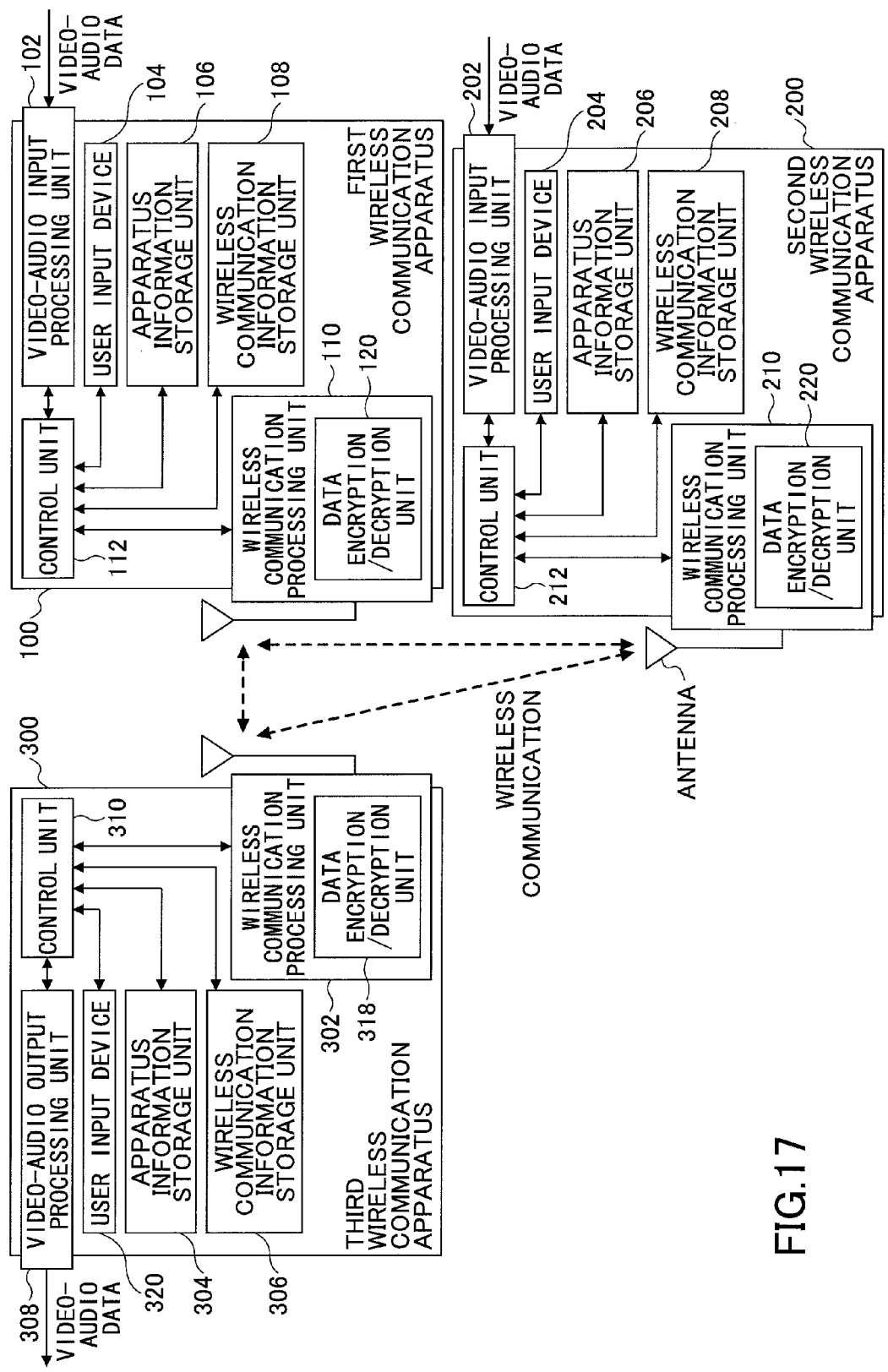
FIG. 17 is a drawing illustrating another exemplary configuration of a communication system.

FIG. 17 is a drawing illustrating another exemplary configuration of a communication system. FIG. 17 illustrates a wireless network projector system as an example of a communication system.

<First Wireless Communication Apparatus>

The first wireless communication apparatus 100 of a fourth embodiment may include a data encryption/decryption unit 120 in addition to components of the first wireless communication apparatus 100 of the first embodiment illustrated by FIG. 1.

The data encryption/decryption unit 120 generates a master key using an algorithm that is the same as the algorithm used by the third wireless communication apparatus 300. The data encryption/decryption unit 120 generates an encryption key based on the master key and a MAC address of the third wireless communication apparatus 300. The data encryption/decryption unit 120 may be configured to use a push button method of a Wi-Fi Protected Setup (WPS) standard for the wireless LAN in generating a master key and an encryption key. In this case, for example, buttons of the source apparatus and the synchronization apparatus are pressed as a preparation for an encryption process. The data encryption/decryption unit 120 encrypts video-audio data to be transmitted to the third wireless communication apparatus 300 by using the encryption key. The video-audio data encrypted by the data encryption/decryption unit 120 is transmitted via the wireless communication processing unit 110 to the third wireless communication apparatus 300.

<Third Wireless Communication Apparatus>

The third wireless communication apparatus 300 of the fourth embodiment may include a data encryption/decryption unit 318 in addition to components of the third wireless communication apparatus 300 of the first embodiment illustrated by FIG. 1.

The data encryption/decryption unit 318 generates a master key using an algorithm that is the same as the algorithm used by the first wireless communication apparatus 100. The data encryption/decryption unit 318 obtains a decryption key corresponding to the encryption key based on the master key and the MAC address of the third wireless communication apparatus 300. For example, the data encryption/decryption unit 318 may be configured to obtain the decryption key from a key distribution center (not shown). The data encryption/decryption unit 318 decrypts the encrypted video-audio data received from the first wireless communication apparatus 100 by using the decryption key, and inputs the decrypted video-audio data to the control unit 310.

<Process Performed by Wireless Network Projector System>

FIG. 18 is a sequence chart illustrating a variation of a process performed by the wireless network projector system.

In the example of FIG. 18, a user input is performed on the first wireless communication apparatus 100 to request the first wireless communication apparatus 100 to transmit video-audio data. The first wireless communication apparatus 100 transmits encrypted video-audio data to the third wireless communication apparatus 300, and the third wireless communication apparatus 300 decrypts the encrypted video-audio data transmitted from the first wireless communication apparatus 100.

At step S1802, a synchronization process, a connection process, and a communication band reservation process for wireless communications are performed between the first wireless communication apparatus 100, the second wireless communication apparatus 200, and the third wireless communication apparatus 300. The synchronization process, the connection process, and the communication band reservation process are performed according to a standard used among the first wireless communication apparatus 100, the second wireless communication apparatus 200, and the third wireless communication apparatus 300. For example, these processes are performed according to a standard such as WiMedia or IEEE 802.15.3c.

At step S1804, the first wireless communication apparatus 100 generates a master key.

At step S1806, the third wireless communication apparatus 300 generates a master key.

At step S1808, generation and sharing of an encryption key are performed between the first wireless communication apparatus 100 and the third wireless communication apparatus 300. For example, the first wireless communication apparatus 100 generates an encryption key based on the master key and a MAC address of the third wireless communication apparatus 300. Also, the third wireless communication apparatus 300 obtains a decryption key based on the master key and the MAC address of the third wireless communication apparatus 300.

At step S1810, a user input A is input to the first wireless communication apparatus 300. For example, the user input A may be detected when the button switch of the user input device 104 of the first wireless communication apparatus 100 is pressed for a time period that is less than a predetermined time period. As another example, the user input A may be detected when the number of times that the button switch of the user input device 104 of the first wireless communication apparatus 100 is pressed is different from a predetermined number of times.

At step S1812, the first wireless communication apparatus 100 transmits a transmission start request to the third wireless communication apparatus 300.

At step S1814, the third wireless communication apparatus 300 transmits a response to the transmission start request to the first wireless communication apparatus 100.

At step S1816, the third wireless communication apparatus 300 transmits a transmission stop request to the second wireless communication apparatus 200.

At step S1818, the second wireless communication apparatus 200 transmits a response to the transmission stop request to the third wireless communication apparatus 300.

At step S1820, the second wireless communication apparatus 200 enters a power-saving mode because the second wireless communication apparatus 200 is not going to transmit video-audio data. For example, the second wireless communication apparatus 200 enters the power-saving mode by gating hardware clocks. That is, when the video-audio input processing unit 202 is implemented as a hardware component, the second wireless communication apparatus 200 stops supplying clocks and/or power to the video-audio input processing unit 202.

At step S1822, the first wireless communication apparatus 100 transmits video-audio data according to a standard used among the first wireless communication apparatus 100, the second wireless communication apparatus 200, and the third wireless communication apparatus 300. For example, the first wireless communication apparatus 100 transmits video-audio data according to a standard such as WiMedia or IEEE 802.15.3c. More specifically, the first wireless communication apparatus 100 places video-audio data in the frame body of the basic MAC frame format described above with reference to FIG. 2. In wireless communication standards such as WiMedia, IEEE 802.15.3c, and wireless LAN, a communication destination is identified using an address such as a MAC address.

Thus, according to the fourth embodiment, video-audio data is encrypted before being transmitted. This configuration makes it possible to reduce the risk that video-audio data is stolen during wireless communications, and thereby makes it possible to construct a system with high security.

Some or all of the components of each of the first wireless communication apparatus 100, the second wireless communication apparatus 200, and the third wireless communication apparatus 300 may be implemented by hardware. Also, each of the first wireless communication apparatus 100, the second wireless communication apparatus 200, and the third wireless communication apparatus 300 may include a processor and a memory storing a program, and some or all of the components of each of the first wireless communication apparatus 100, the second wireless communication apparatus 200, and the third wireless communication apparatus 300 may be implemented by executing the program in the memory by the processor.

An aspect of this disclosure makes it possible to switch audio-visual apparatuses from which data is wirelessly transmitted, by using an input device of one of the audio-visual apparatuses.

A communication system (e.g., the wireless network projector system), a transmission apparatus (e.g., the first/second wireless communication apparatus 100/200), a reception apparatus (e.g., the third wireless communication apparatus 300), and a communication method are described above as preferred embodiments. However, the present invention is not limited to the specifically disclosed embodiments, and variations and modifications may be made without departing from the scope of the present invention.

Although apparatuses are described using functional block diagrams in the above embodiments, the apparatuses may be implemented by hardware, software, or a combination thereof.

What is claimed is:

1. A communication system, comprising:
a plurality of transmission apparatuses; and
a reception apparatus,
wherein each of the transmission apparatuses includes
a data input processing unit to which data is input,
a first controller that performs a control process for transmitting the data input to the data input processing unit, and
a first wireless communication processing unit that transmits the data to the reception apparatus according to the control process performed by the first controller;
wherein the first controller performs a control process for causing another transmission apparatus of the transmission apparatuses to transmit data input to the other transmission apparatus to the reception apparatus;
wherein the reception apparatus includes
a second wireless communication processing unit that receives data from one of the transmission apparatuses,
a second controller that performs a control process for outputting the data received by the second wireless communication processing unit, and
a data output processing unit that outputs the data received by the second wireless communication processing unit according to the control process performed by the second controller; and
wherein the first controller performs a control process for causing the other transmission apparatus to transmit the data input to the other transmission apparatus to the reception apparatus and for also causing the first wireless communication processing unit to transmit the data input to the data input processing unit to the same reception apparatus, the data input to the other transmission apparatus being different from the data input to the data input processing unit.

2. The communication system as claimed in claim 1, wherein the first controller performs a control process for causing the first wireless communication processing unit to stop transmission of the data input to the data input processing unit and also causing the other transmission apparatus to transmit the data input to the other transmission apparatus.

3. The communication system as claimed in claim 1, wherein the transmission apparatuses and the reception apparatus perform a reservation process for reserving a frequency band used for communications.

4. The communication system as claimed in claim 1, wherein when the control process for causing the other transmission apparatus to transmit the data input to the other transmission apparatus is performed by the first controller, the other transmission apparatus and the reception apparatus perform a reservation process for reserving a frequency band used for communications.

5. The communication system as claimed in claim 1, wherein
each of the transmission apparatuses further includes a compression unit that compresses the data input to the data input processing unit;
the first controller performs a control process for transmitting the compressed data;

the reception apparatus further includes a decompression unit that decompresses the compressed data received by the second wireless communication processing unit; and the second controller performs a control process to output the decompressed data.

6. The communication system as claimed in claim 1, wherein each of the transmission apparatuses further includes an encryption unit that encrypts the data input to the data input processing unit;

the first controller performs a control process for transmitting the encrypted data;

the reception apparatus further includes a decryption unit that decrypts the encrypted data received by the second wireless communication processing unit; and the second controller performs a control process for outputting the decrypted data.

7. A transmission apparatus for a communication system including a plurality of transmission apparatuses and a reception apparatus, the transmission apparatus comprising:

a data input processing unit to which data is input;

a controller that performs a control process for transmitting the data input to the data input processing unit; and a wireless communication processing unit that transmits the data to the reception apparatus according to the control process performed by the controller, wherein the controller performs a control process for causing another transmission apparatus of the transmission apparatuses to transmit data input to the other transmission apparatus to the reception apparatus; and wherein the controller performs a control process for causing the other transmission apparatus to transmit the data input to the other transmission apparatus to the reception apparatus and for also causing the wireless communication processing unit to transmit the data input to the data input processing unit to the same reception apparatus, the data input to the other transmission apparatus being different from the data input to the data input processing unit.

8. A method for a communication system including a plurality of transmission apparatuses and a reception apparatus, the method comprising:

steps, performed by a transmission apparatus of the transmission apparatuses, of inputting data, performing a control process for transmitting the input data, transmitting the data to the reception apparatus according to the control process for transmitting the input data, and performing a control process for causing another transmission apparatus of the transmission apparatuses to transmit data input to the other transmission apparatus to the reception apparatus; and steps, performed by the reception apparatus, of receiving data from one of the transmission apparatuses, performing a control process for outputting the received data, and outputting the received data according to the control process for outputting the received data, wherein the transmission apparatus performs a control process for causing the other transmission apparatus to transmit the data input to the other transmission apparatus to the reception apparatus and for also transmitting the data input to the transmission apparatus to the same reception apparatus, the data input to the other transmission apparatus being different from the data input to the transmission apparatus.

\* \* \* \* \*